(12) United States Patent
Mattes et al.

(10) Patent No.: US 7,628,944 B2
(45) Date of Patent: Dec. 8, 2009

(54) SPINNING, DOPING, DEDOPING AND REDOPING POLYANILINE FIBER

(75) Inventors: Benjamin R. Mattes, Santa Fe, NM (US); Phillip N. Adams, Albuquerque, NM (US); Dali Yang, Los Alamos, NM (US); Lori A. Brown, Santa Fe, NM (US); Andrei G. Fadeev, Santa Fe, NM (US); Ian D. Norris, Santa Fe, NM (US)

(73) Assignee: Santa Fe Science and Technology, Inc., Santa Fe, NM (US)

( * ) Notice: Subject to any disclaimer, the term of this patent is extended or adjusted under 35 U.S.C. 154(b) by 805 days.

(21) Appl. No.: 10/672,323

(22) Filed: Sep. 26, 2003

(65) Prior Publication Data

US 2004/0119187 A1   Jun. 24, 2004

Related U.S. Application Data

(60) Provisional application No. 60/423,092, filed on Oct. 30, 2002, provisional application No. 60/495,493, filed on Aug. 15, 2003.

(51) Int. Cl.
*D01D 5/06* (2006.01)
*D01D 5/16* (2006.01)
*D01D 7/00* (2006.01)
*D01D 10/02* (2006.01)
*D01F 6/74* (2006.01)

(52) U.S. Cl. .................. 264/103; 264/184; 264/210.8; 264/211.12; 264/211.17; 264/232; 264/344

(58) Field of Classification Search .............. 264/103, 264/184, 210.8, 211.12, 211.17, 232, 344
See application file for complete search history.

(56) References Cited

U.S. PATENT DOCUMENTS

| | | | |
|---|---|---|---|
| 5,069,820 A | 12/1991 | Jen et al. | |
| 5,160,457 A | 11/1992 | Elsenbaumer | |
| 5,358,556 A | 10/1994 | Kaner et al. | |
| 5,436,317 A | 7/1995 | Jarvinen et al. | |

FOREIGN PATENT DOCUMENTS

| WO | WO 99/24991 A1 | 5/1999 |
|---|---|---|
| WO | WO 02/063073 A1 | 8/2002 |

OTHER PUBLICATIONS

Stephen J. Pomfret et al., "Inherently Electrically Conductive Fibers Wet Spun from a Sulfonic Acid-Doped Polyaniline Solution," Advanced Materials, 1998, 1351-1353, v. 10-16.
M. F. Hundley et al., 'The influence of 2-acrylamido-2-methyl-1-propanesulfonic acid (AMPSA) additive concentration and stretch orientation on electronic transport in.
PCT International Search Report—Jan. 28, 2004.

*Primary Examiner*—Leo B Tentoni
(74) *Attorney, Agent, or Firm*—Samuel M. Freund; Cochran Freund & Young LLC

(57) ABSTRACT

A composition of matter suitable for spinning polyaniline fiber, a method for spinning electrically conductive polyaniline fiber, a method for exchanging dopants in polyaniline fibers, and methods for dedoping and redoping polyaniline fibers are described.

20 Claims, 9 Drawing Sheets

SPINNING, DOPING, DEDOPING AND REDOPING POLYANILINE FIBER

RELATED CASES

The present patent application claims the benefit of Provisional Patent Application Ser. No. 60/423,092 filed on Oct. 30, 2002 entitled "Polyaniline Fiber" by Benjamin R. Mattes, and of Provisional Patent Application Ser. No. 60,495,493 filed on Aug. 15, 2003 entitled "Doping, Dedoping and Redoping Polyaniline Fiber" by Benjamin R. Mattes et al.

STATEMENT REGARDING FEDERAL RIGHTS

This invention was made with government support under Contract No. MDA972-99-C-0004 and under Contract No. NBCHC020069 awarded by the U. S. Defense Advance Research Projects Agency to Santa Fe Science and Technology, Inc., Santa Fe, N. Mex. 87507. The government has certain rights in the invention.

FIELD OF THE INVENTION

The present invention is related generally to polymeric fibers and, more particularly, to the spinning of polyaniline fibers and the manipulation of dopants therein to achieve desired fiber characteristics.

BACKGROUND OF THE INVENTION

Successful processing of polyaniline emeraldine base (PANI-EB) into useful high strength and high conductivity fibers requires solutions that are suitable for continuous fiber production. In "Conductive Polymer Compositions" by Phillip Norman Adams et al., International Publication Number: WO 99/24991, published on 20 May 1999, a fluid conductive mixture for use in the preparation of coatings, films and fibers based on polyaniline in base form doped with a sulfonic acid having in addition to at least one sulfonic acid group a second hydrogen-bonding functional group dispersed in an acid solvent having a $pK_a$ less than 4.5 but substantially higher than that of the sulfonic acid, is described. Specific examples of 2-acrylamido-2-methyl-1-propanesulfonic acid (AMPSA) as the sulfonic acid and dichloroacetic acid (DCAA) spun into a competitive solvent in which the DCAA is soluble, but in which polyaniline is not soluble are disclosed. The ratio of the number of AMPSA molecules to the number of nitrogen atoms in the polyaniline as a reference was between 0.3 and 1.0; typically this ratio was 0.6. Dry polyaniline powder ($M_w$~150,000 g·mol$^{-1}$) was ground with AMPSA and added over a 5 min. period to the DCM under flowing nitrogen in a glove box to form a mixture having 9 mass % solids. The solution pressurized with nitrogen was extruded into the coagulant at 50±5° C. Adams et al. stated that the maximum solids content at which level gelation is not experienced is 5 mass %.

In "Inherently Electrically Conductive Fibers Wet Spun from a Sulfonic Acid-Doped Polyaniline Solution" by Stephen J. Pomfret et al., Adv. Mat. 10, 1351 (1998), it is stated that: "The primary alternative method of producing conductive polyaniline involves processing from the electrically insulating emeraldine base (EB) form, then post-doping with an aqueous protonic acid. There are disadvantages of this method: in most cases the resulting material is doped inhomogeneously; it is dedoped relatively easily; and the materials properties are usually adversely affected on doping. Processing from an inherently conductive solution, however, results in homogeneous doping, and the bulky sulfonic acids cannot be easily removed from the material afterwards."

It is known that the performance of conducting-polymer-based devices is dependent on the properties of the dopant anion. As an example, when polyaniline fibers are used in electrochemical devices with non-aqueous electrolytes (e.g. organic solvent or ionic liquid), the sulfonic acid that is used to solublize the doped form of the polymer to enable fiber production (for example, AMPSA) inhibits the performance of the device. As stated in "Long-Lived Conjugated Polymer Electrochemical Devices Incorporating Ionic Liquids," International Publication Number WO 02/063073 A1, as-spun AMPSA-doped polyaniline (PANI.AMPSA) fiber is a poor choice for the active electrode in electrochemical devices containing an organic solvent electrolyte (for example, LiPF$_6$ dissolved in propylene carbonate); that is, weak electroactivity of such fibers may be deduced from the low observed currents in cyclic voltammograms thereof. Moreover, little actuation (change of length) has been observed for such fibers when a voltage is applied thereto. This is related to the large size of the AMPSA anion and, consequently, a low diffusion coefficient, thereby rendering the anions unable to exchange with the PF$_6^-$ anions in the electrolyte.

Furthermore, for certain membrane-based separation applications, specific dopant anions lead to enhanced performance of polyaniline membranes. See, for example, U.S. Pat. No. 5,358,556 for "Membranes Having Selective Permeability" which issued to Kaner et al. on Oct. 25, 1994.

Accordingly, it is an object of the present invention to prepare stable, high solids content spinning solutions from high molecular weight polyaniline.

Another object of the invention is to provide a method for spinning polyaniline fiber.

Yet another object of the present invention is to provide a method for partially or totally replacing dopants present in as-spun polyaniline fibers with selected dopants in order to achieve desired characteristics of the fibers.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention as embodied and broadly described herein, the composition of matter hereof includes between 6 and 14 mass % of an AMPSA/polyaniline mixture, and between 0.1 and 0.6 mass % of water in DCAA, where there are between 30 and 100 AMPSA molecules per 100 aniline repeat units of the polyaniline.

In another aspect of the present invention, in accordance with its objects and purposes, the method for spinning polyaniline fiber hereof includes: adding between 6 and 14 mass % of a mixture of AMPSA and polyaniline containing between 2 and 12 mass % of water to DCAA, such that there are between 30 and 100 molecules of AMPSA per 100 aniline repeat units of the polyaniline, forming thereby a composition, whereby the temperature of the composition does not rise above about 35° C.; extruding the composition through a spinneret into a nonsolvent or coagulant for the polyaniline, thereby forming a polyaniline fiber.

In yet another aspect of the present invention, in accordance with its objects and purposes, the method for exchanging dopant molecules in electrically conductive fibers spun from a solution including polyaniline, AMPSA and DCAA with a selected dopant molecule hereof, includes extruding the spin solution into a coagulant, thereby causing the spin solution to coagulate and form a fiber, and immersing the resulting fiber in a solution containing the selected dopant molecule for a time effective to achieve dopant exchange.

In still another aspect of the present invention, in accordance with its objects and purposes, the method for removing dopant molecules from electrically conductive fibers spun from a solution comprising polyaniline, AMPSA and DCAA hereof, includes extruding the spin solution into a solution containing a coagulant, thereby causing the spin solution to coagulate and form a polyaniline fiber, and immersing the resulting polyaniline fiber in a solution effective for removing the dopant molecules for a time sufficient to achieve a chosen level of dopant molecule removal.

In another aspect of the present invention, in accordance with its objects and purposes, the method for redoping electrically conductive fibers spun from a solution comprising polyaniline, AMPSA and DCAA with a selected dopant molecule hereof, includes extruding the spin solution in a solution containing a coagulant, thereby causing the spin solution to coagulate and form a polyaniline fiber, immersing the resulting fiber in a solution effective for removing the dopant molecules for a time sufficient to achieve a chosen level of dopant molecule removal, and immersing the dedoped polyaniline fiber in a solution containing the selected dopant molecules for a time effective for achieving a chosen level of selected dopant molecules in the polyaniline fiber.

Benefits and advantages of the invention include the ability to continuously spin polyaniline fiber having selected properties, and to change these properties by manipulating the dopant molecules in the polyaniline fiber.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 1a is a scanning electron microscope (SEM) micrograph of a 28 μm solid polyaniline fiber spun in accordance with the teachings of the present invention, while

FIG. 9a is a cyclic voltammogram for a 10 mm length of polyaniline fiber redoped with triflic acid, while

DETAILED DESCRIPTION

Figure 1A:
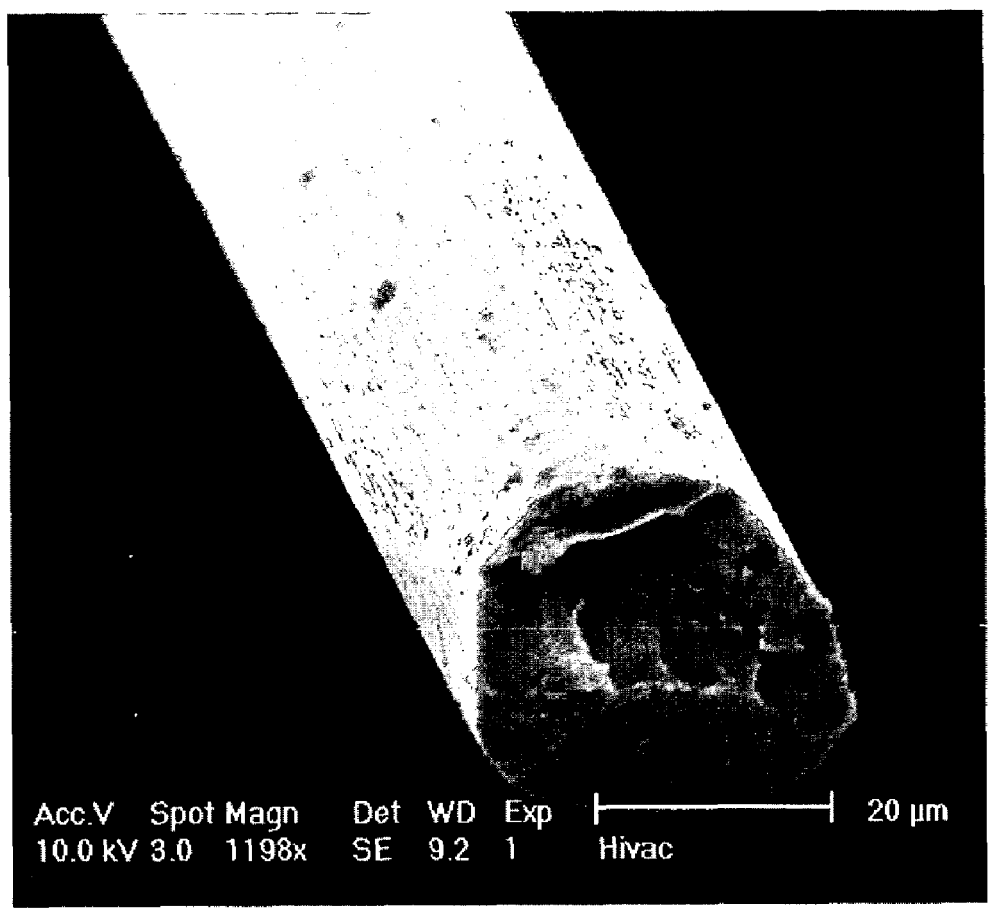

Briefly, the present invention includes a method for preparing stable solutions of emeraldine base polyaniline (PANI-EB) and 2-acrylamido-2-methyl-1-propanesulfonic acid (AMPSA) in dichloroacetic acid (DCAA) [PANI-EB-AMPSA-DCAA] dope solutions having high solids content, and the characterization of these solutions with respect to their properties over time, as well as characterization of the short and long term conductivities and mechanical properties of the resulting as-spun fibers.

Wet fiber spinning of polyaniline in accordance with the present invention includes: (1) preparation of stable spinning solutions, also termed the "spinning dope" or "dope"; (2) extruding the dope under pressure through a spinneret into a coagulating solvent, wherein the dope solvent is exchanged with the coagulant, causing precipitation and solidification of the polyaniline into a fiber; (3) collecting the formed polyaniline fiber onto a series of take-up drums (called godets), where further extraction of the dope solvent occurs and/or chemical modification of the fiber takes place; (4) stretching the fiber between at least two godets such that the mechanical and electrical conductivity properties of the fiber are altered by inducing structural anisotropy; and (5) winding the fiber onto packages or bobbins. While the above described process is referred to as wet-spinning, it will be apparent to one skilled in the art that the polyaniline solutions described herein can be readily adapted to other fiber manufacture processes including, as examples, dry-spinning, dry-jet wet spinning or air-gap spinning, and gel spinning.

In the wet spinning process, polyaniline fibers are formed by extruding narrow diameter streams of the PANI-AMPSA-DCCA spinning solution through a spinneret (extrudate) into a coagulant. The solution is first filtered to remove small solid particles that would block the orifice of the spinneret, before being forced under pressure through the holes of the spinneret using a gear pump or other suitable device. A spinneret is a die having one or more holes through which the solution is extruded into the coagulation bath. Spinnerets used for industrial fiber spinning typically have between 50 and 200,000 holes with diameters ranging from 10 to 1000 μm. The shape of the orifice of the spinneret dictates the geometrical shape of the cross-sectional area of the fiber in the solid-state. Clearly, many spinneret shapes can be used to process the fibers of the present invention; however, the processing of solid fibers and hollow fibers are described hereinbelow.

The downstream side of the spinneret is situated either above or below the liquid surface of the coagulation bath, in order that the spinning dope exiting the spinneret enters the coagulant immediately or soon after exiting. Formation of the polyaniline fiber occurs rapidly as the mixture enters the coagulation bath and contacts the nonsolvent which extracts or withdraws the spinning solvent from the jets of spinning solution exiting each spinneret hole causing the polymer to supersaturate the spinning solution and to precipitate as solids in the shape of fibers.

As the solvent for the dope solution (DCAA) diffuses from the forming fibers in the coagulation bath, the polymer continues to precipitate and to form a semi-solid fiber. While still in the coagulation bath, the fiber achieves sufficient cohesion and strength to remain unbroken upon removal from the bath. As the solvent diffuses out of the extrudate into the bath, the polymer precipitates initially as a gel at the extrudate-coagulant interface but progressively throughout the fiber spinning process, the extrudate approaches its final fiber properties. Coagulation rate, concentration and temperature of the spinning solution, composition, concentration and temperature of the coagulating liquid; and the stretch applied during spinning between godets are processing variables which influence the gel structure and the final fiber properties.

The described spinning process is based on precipitation in the coagulation bath, without chemical modification of the newly formed fiber; however, modifications may be instituted subsequently, as the formed fiber is contacted with solutions in the godet baths. The fibers are either continuously or periodically removed from the coagulation bath by a take-up or pick-up roll, or godet, followed by a series of further processing operations, including immersion in a series of coagulation baths, washing, wet stretching or orientational drawing, drying, and optionally, hot stretching and annealing to produce selected physical properties for use in textile materials. This further processing of the fiber leads to greater uniformity and microscopic orientation, and hence to better tensile properties, such as high modulus and tenacity.

The fibers from each spinneret, upon exiting the coagulation bath are typically combined to form a single large strand or tow. The fibers are washed with an appropriate non-solvent, but not necessarily to coagulant, to remove the desired amount of spinning solvent in one or more baths or showers and then stretched in one or more draw baths containing water that is at or close to boiling. Acidic or basic aqueous solutions, or acids dissolved in alcohol have been successfully used, although other solutions are expected to be useful. It should be noted that stretching can also be carried out in conjunction with the washing.

Figure 1B:
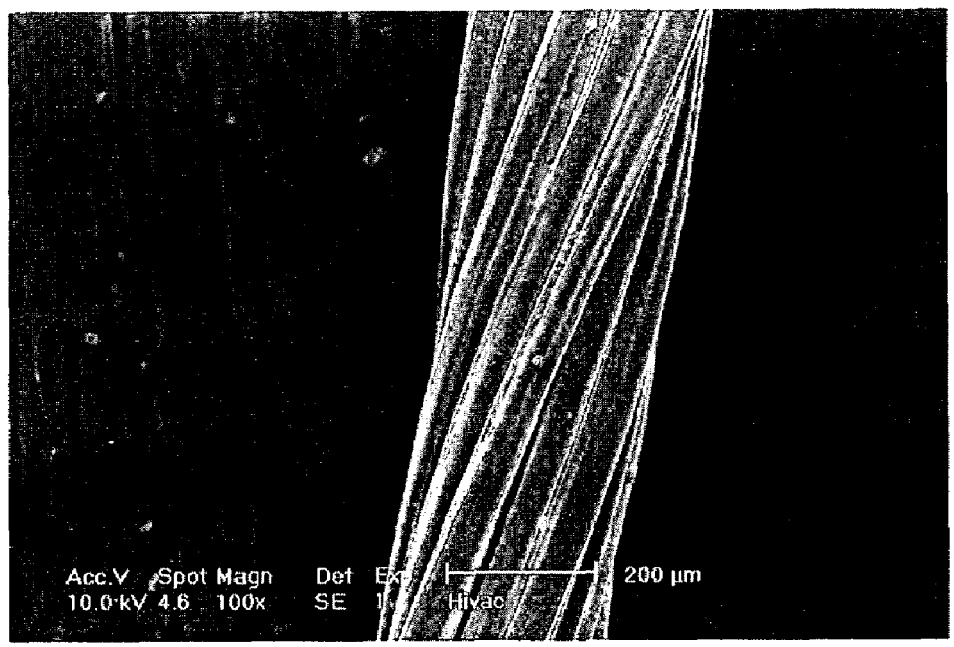
FIG. 1b is a SEM micrograph of a yarn formed from 20 polyaniline fibers having a twist ratio of 7 turns per inch.
Figure 2:
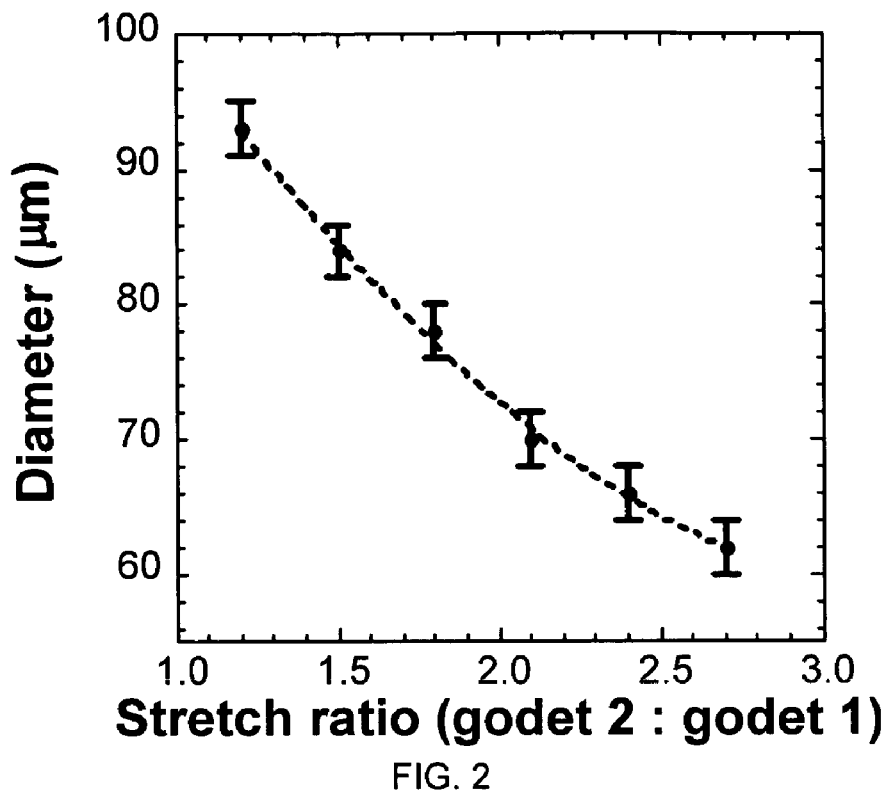
FIG. 2 is a graph of fiber diameter as a function of fiber stretch ratio for fiber spun from the A solution.
Figure 3:
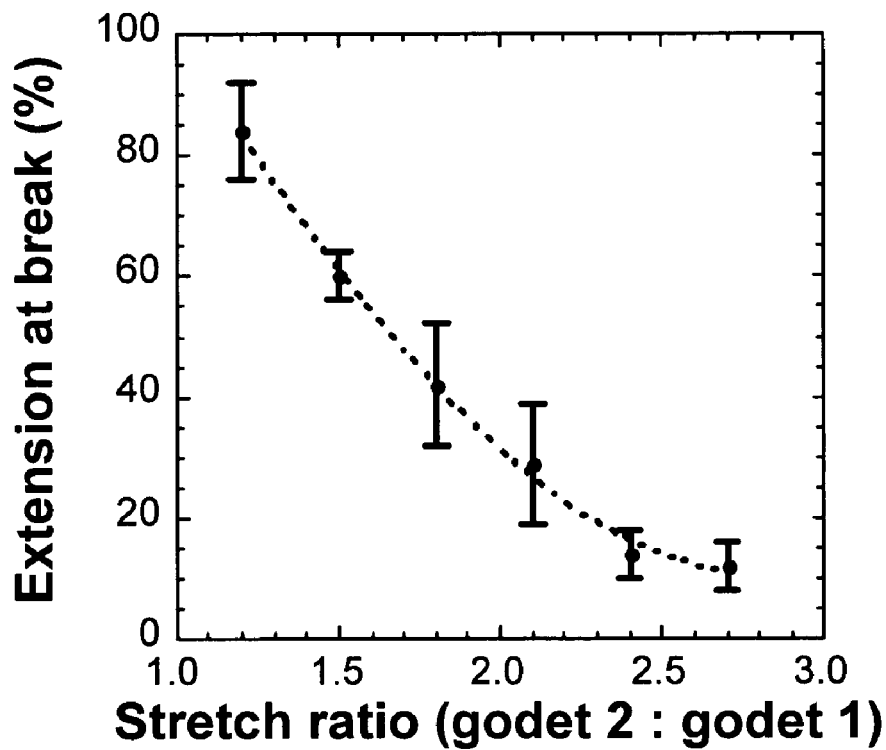
FIG. 3 is a graph of the percent extension of the fiber at break as a function of stretch ratio for fiber spun from the A solution.
Figure 4:
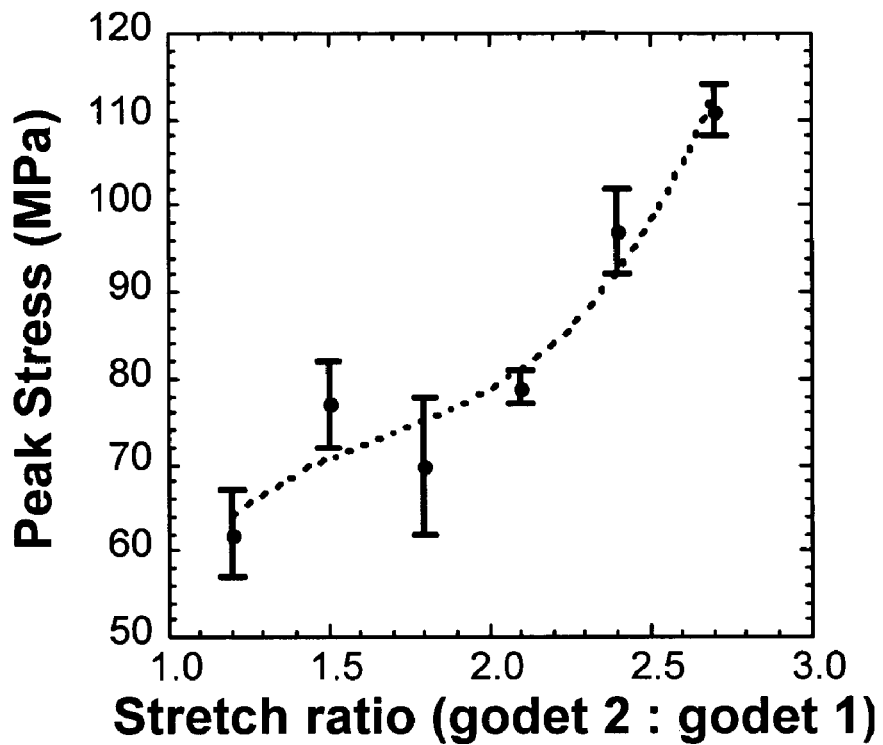
FIG. 4 is a graph of fiber peak stress as a function of stretch ratio for fiber spun from the A solution.
Figure 5:
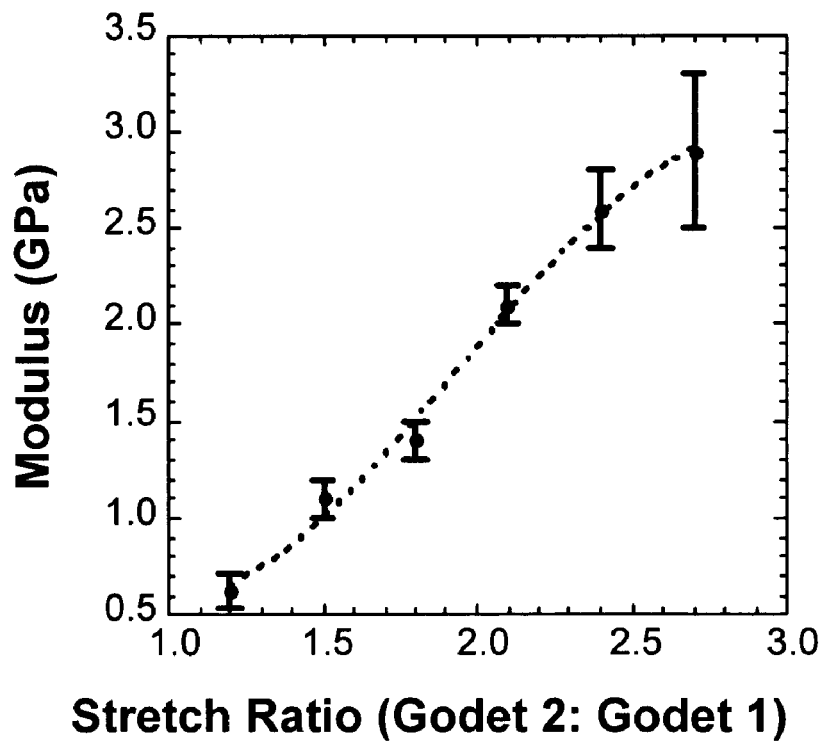
FIG. 5 is a graph of fiber modulus as a function of stretch ratio for fiber spun from the A solution.

Reference will now be made in detail to the present preferred embodiments of the invention examples of which are illustrated in the accompanying drawings. Turning now to FIG. 1a, a scanning electron microscope (SEM) micrograph of a 28 μm solid polyaniline fiber spun in accordance with the teachings of the present invention, shows that dense, nonporous polyaniline fibers are formed. Voids and pores are undesirable in solid fibers as they can negatively affect the mechanical properties of the fibers. After drawing the fiber on the godets, the void volume fraction is observed to be <0.001%. FIG. 1b is a SEM micrograph of a yarn formed from 20 polyaniline fibers having a twist ratio of 7 turns per inch, showing that the fibers have sufficient structural integrity to be formable into yarns, braids and weaves, as examples.

Although polyaniline used for the EXAMPLEs hereof was produced from polymerization of unsubstituted aniline in accordance with the synthesis set forth in Section A, hereinbelow or from other syntheses thereof, the term polyaniline as used herein includes the following polyanilines which are expected to perform in a similar manner. Polyanilines suitable for use in accordance with the present invention are homopolymers and copolymers derived from the polymerization of unsubstituted or substituted anilines of the form:

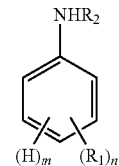

where n is an integer between 0 and 2; m is an integer between 3 and 5, such that n+m=5; $R_1$ is selected so as to be the same or different at each occurrence and is selected from the group consisting of aryl-, alkyl-, alkenyl-, alkylthio- and alkoxy- moieties having between 1 and about 30 carbon atoms, cyano-, halo-, acid functional groups, such as those from sulfonic acid, carboxylic acid, phosphonic acid, phosphoric acid, phosphinic acid, boric acid, sulfinic acid and derivatives thereof, such as salts, esters, and the like; amino-, alkylamino-, dialkylamino-, arylamino-, hydroxyl-, diarylamino-, and alkylarylamino- moieties; or alkyl, aryl, alkenyl, alkylthio or alkoxy substituted with one or more acid functional groups, such as sulfonic acid, carboxylic acid, phosphonic acid, phosphoric acid, phosphinic acid, boric acid, sulfinic acid and derivatives thereof, such as salts, esters, and the like. $R_2$ is the same or different at each occurrence and, is either one of the $R_1$ substituents or hydrogen.

Polyanilines suitable for use in this invention are generally those which include the following repeat units or a combination thereof having various ratios of these repeat units in the polyaniline backbone:

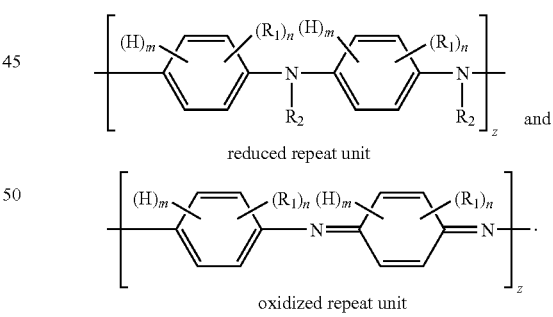

As an example:

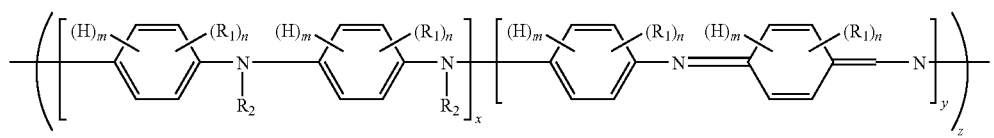

where x represents that fraction of the reduced repeat units in the polymer backbone and 7 represents at fraction of the oxidized repeat units in the polymer backbone, such that x+y=1; and z is an integer equal to or greater than about 20. For the polymer in its emeraldine base oxidation state, x=0.5 and y=0.5.

It is known that the mechanical strength of fibers produced from a wet-spinning process is related to the solids content of the spinning solution. Additionally, higher quality fibers derive from higher molecular weight polyaniline starting material.

High solids content polyaniline solutions prepared for fiber spinning included 60 AMPSA molecules per one hundred aniline repeat units in the polymer backbone since these solutions were found to have the highest conductivity, and are denoted as PANI.AMPSA$_{0.6}$ in what follows (See, for example, "The influence of 2-acrylamido-2-methyl-1-propanesulfonic acid (AMPSA) additive concentration and stretch orientation on electronic transport in AMPSA-modified polyaniline films prepared from an acid solvent mixture" by M. F. Hundley et al., Synth. Met. 129, 291-297 (2002).). Solutions having between 30 and 100 AMPSA molecules per 100 aniline repeat units can also be processed in accordance with the teachings of this invention.

The stability of dope solutions against gelation decreases with increasing solids content and with increasing polyaniline molecular weight. Thus, prior to the present invention, the period of usefulness of high solids content/high molecular weight solutions has been short. By maintaining lower temperatures during mixing, and adding water to the solution, gelation of PANI.AMPSA$_{0.6}$/DCAA solutions can be significantly retarded. Since the temperature of the solution increases during mixing with increasing viscosity due to viscous dissipation of energy, solutions were placed in contact with a cooling bath during preparation, and the solids were added at a rate sufficiently slow to keep the solution temperature below about 35° C.

Solutions stored between 0 and 5° C. for 4 weeks were found to produce fibers having similar electrical and mechanical properties to those spun immediately after solution preparation. Solutions stored for approximately 4 months possessed similar rheological properties to more recently prepared solutions, and are expected to yield similar quality fibers, while solutions stored under identical conditions were found to be partially gelled after about 9 months of storage.

Solutions of PANI.AMPSA$_{0.6}$ in DCM having between 6 mass % and 14 mass % of solids were prepared at 25° C.±5° C. Fiber properties were reproducible given a particular mixing protocol when the mass scale, temperature (±2° C.), and total mixing times were consistent.

The present invention also includes a method for doping, dedoping and redoping polyaniline fibers to obtain chosen properties thereof. As examples, the electrochemical activity of polyaniline fibers can be greatly improved, and the selectivity of hollow polyaniline fibers when used as membranes can be tailored by replacing the dopant present in the fiber as a result of being incorporated into the fiber during the acid-spinning process with a selected anion. As will be demonstrated hereinbelow, dopant substitutions to select one particular property do not necessarily affect other physical properties of the fiber from the group of properties including tensile strength, percent extension at the break point, and fiber electrical conductivity when fibers are doped to the same levels. As an example, in order for polyaniline fibers prepared using AMPSA in the acid-spinning process of the present invention and described hereinbelow to be used for certain electrochemical and other devices, the AMPSA is replaced with other dopant acids that are compatible with the electrolyte, and enable electroactivity of the polyaniline.

A. Representative Synthesis of High Molecular-Weight, Halogen-Free Polyaniline

Water (6,470 g) was first added to a 50 L jacketed reaction vessel fitted with a mechanical stirrer. Phosphoric acid (15,530 g) was then added to the water, with stirring, to give a 60 mass % phosphoric acid solution. Aniline (1,071 g, 11.5 moles) was added to the reaction vessel over a 1 h period by means of a dropping funnel in the top of the reaction vessel. The stirred aniline phosphate was then cooled to −35.0° C. by passing a cooled 50/50 by mass, methanol/water mixture through the vessel jacket. The oxidant, ammonium persulfate (3,280 g, 14.37 moles) was dissolved in water (5,920 g), and the resulting solution was added to the cooled, stirred reaction mixture at a constant rate over a 30 h period. The temperature of the reaction mixture was maintained at −35.0±1.5° C. during the duration of the reaction to ensure good product reproducibility between batches.

The reactants were typically permitted to react for 46 h, after which the polyaniline precipitate was filtered from the reaction mixture and washed with about 25 L of water. The wet polyaniline filter cake was then mixed with a solution of 800 cc of 28% ammonium hydroxide solution mixed with 20 L of water and stirred for 1 h, after which the pH of the suspension was 9.4.

The polyaniline slurry was then filtered and the polyaniline filtrate washed 4 times with 10 L of water per wash, followed by a washing with 2 L of isopropanol. The resulting polyaniline filter cake was placed in plastic trays and dried in an oven at 35° C. until the water content was below 5 mass %. The recovered mass of dried polyaniline was 974 g (10.7 moles) corresponding to a yield of 93.4%. The dried powder was sealed in a plastic bag and stored in a freezer at −18° C. The weight average molecular weight ($M_w$) of the powder was found to be 280,000 g·mol$^{-1}$, although $M_w$ values between about 100,000 and about 350,000 g·mol$^{-1}$ have been obtained using this synthesis by controlling the reaction temperature between 0 and −35° C., respectively. Gas phase chromatograph (GPC) molecular weight data was obtained using a 0.02 mass % solution of EB in NMP containing 0.02 mass % lithium tetrafluoroborate. The flow rate of the solution was 1 mL·min.$^{-1}$, and the column temperature was 60° C. The Waters HR5E column utilized was calibrated using Polymer Labs PS1 polystyrene standards, and the polymer eluted from the GPC column was detected using a Waters 410 refractive index detector coupled with a Waters 996 UV-Vis photodiode array.

The concentration of phosphoric acid was chosen in order to prevent the reaction mixture from freezing at low temperatures. Sulfuric acid, formic acid, acetic acid, difluoroacetic acid, and other inorganic and organic acids have either been found to be or are expected to be suitable as well. Since the aniline polymerization reaction is exothermic, to ensure good product reproducibility between batches, the temperature is controlled to keep any exotherm less than a few degrees.

Although this synthesis was used for the polyaniline spinning solutions set forth hereinbelow, polyaniline can be prepared by any suitable method; as examples, chemical polymerization of appropriate monomers from aqueous solutions, mixed aqueous and organic solutions, or by electrochemical polymerization of appropriate monomers in solutions or emulsions.

B. Preparation of Spin Solutions Having 7-14 Mass % PANI.AMPSA$_{0.6}$ in DCAA

Solutions having below 7 mass % of PANI.AMPSA$_{0.6}$ using PANI-EB having a weight average molecular weight ($M_w$) of ~300,000 g·mol$^{-1}$ dissolved in DCAA were prepared on the 500 g to 1.5 kg scale as described in EXAMPLE 1 hereinbelow. Solutions having between 7 and 14 mass % PANI.AMPSA$_{0.6}$ in DCM were prepared on the 500 g to 1.5 kg scale in accordance with the following general procedure.

The chemical compositions of the solutions used in the EXAMPLES hereinbelow are tabulated in TABLE 1. All reported solutions were made using PANI-EB having a weight average molecular weight ($M_w$) of ~300,000 g·mol$^{-1}$. However, fibers have been successfully produced using polyaniline having weight average molecular weights between about 90,000 and about 350,000 g·mol$^{-1}$ (defined as high molecular weight polyaniline herein). The use of higher molecular weight polyaniline enables the fibers to survive greater stretch ratios in the spin line without breaking. High stretch ratios are important for obtaining fibers having high electrical conductivity, high modulus and high peak stress.

The PANI-EB powder was dried to achieve the desired individual residual water contents listed in TABLE 1 under ambient conditions or using a vacuum oven at approximately 60° C. The water content of the PANI-EB powder was determined by thermogravimetric analysis (TGA). If the mass % of water in the PANI-EB powder was found to be lower than the chosen amount, additional deionized water was added to the powder prior to preparing the spin solution to achieve the chosen water content. The percentage water in the spinning solutions was between 0.1 and 0.6 mass %, which corresponds to a water content in the polyaniline of between 2 and 12 mass %.

Solution A was prepared by first dissolving ½ of the AMPSA (17.4 g) in the DCM solvent. The remaining AMPSA (17.4 g) was then ground with the PANI-EB powder forming a PANI/AMPSA powder mixture, and added to the DCAA solution in discrete portions with mixing over a 7 h period. Solutions B, C and D were prepared by dissolving all of the AMPSA in the DCM, and adding the PANI-EB powder to the DCAA solution in discrete portions with mixing over a 5-7 h period. The total mixing time for each of these solutions is also listed in TABLE 1.

C. Fiber Spinning

In accordance with the teachings of the present invention, two procedures are described for coagulating polyaniline spinning solutions: a first method uses ethyl acetate (EA) as the coagulant for the solution after it is extruded through the spinneret (EXAMPLE 2), and a second method uses EA as the coagulant followed immersion of the fiber in an acidic solution (for example, phosphoric acid) to further extract DCAA from the fiber, and exchange dopants present in the fiber from the spinning process (EXAMPLE 3). Other coagulants and mixtures of coagulants (for example, 90 mass % of EA and 10 mass % of acetone was used as a coagulant) may be used to remove the DCAA from the spinning solutions. That is, esters, ketones and alcohols, such as butyl acetate, acetone, methylisobutyl ketone, 2-butanone, methanol, ethanol, and isopropyl alcohol in which DCAA is miscible, but in which polyaniline is substantially insoluble, can be employed to coagulate the solution. Either a wet spinning process in which the spinneret is immersed in the coagulant, or a dry-wet spinning process, where an air gap is maintained between the spinneret and the coagulant, was successfully employed.

Dope solutions yielding fibers in a continuous spinning process had viscosities between 8 and 250 Pa·s$^{-1}$, the upper limit arising from limitations of the gear pump utilized.

For both processes, it has been found that applying heat to the fiber assists in the removal of residual DCAA and washing agents (water, as an example), which has been found to stabilize the fiber properties after processing. By both heating the fiber and stretching it, the conductivity of the spun fiber is increased. For the same stretch ratio, the longer the coagulation time for a fiber, the stronger the resulting fiber becomes. For the same coagulation time, higher fiber stretching results

TABLE 1

Summary of compositions for PANI.AMPSA solutions dissolved in DCAA.

| Label | Solids Content (mass %) | Scale (g) | % water in PANI-EB (mass %) | PANI (g) | AMPSA (g) | DCAA (g) | % water in solution (mass %) | Total mixing time (h) | Max. temp (° C.) |
|---|---|---|---|---|---|---|---|---|---|
| A | 12 | 500 | 10 | 27.4 | 34.8 | 437.2 | 0.5 | 11.5 | 28 |
| B | 12 | 500 | 10 | 27.4 | 34.8 | 437.2 | 0.5 | 12.5 | 33 |
| C | 12 | 1,500 | 10 | 84.0 | 104.4 | 1311.6 | 0.5 | 15 | 28 |
| D | 11 | 1,000 | 4 | 46.3 | 63.7 | 890 | 0.2 | 10 | 31 |

For other solutions not reported here, the PANI-EB and AMPSA powders were combined using a ball mill and added to the DCAA in discrete portions. The final solution properties have been found to be independent of the method for powder addition, so long as the rate of powder addition of each portion was chosen to maintain the solution temperature below 35° C. (to avoid gelation).

As the solutions become more concentrated, the viscosity thereof increases. This results in additional heat being generated by viscous dissipation. In order to minimize heat build-up, coolant was circulated around the outside of the mixing vessels employed. The temperature of the mixing solution was continuously monitored using a thermocouple to ensure that the solution temperature did not exceed 35° C.

To remove entrapped air caused by the mixing process, the solutions were degassed under vacuum at 50 mbar for 1 h before they were spun into fibers.

Rheological studies of the spinning solutions indicate that the viscosity for 7 solids mass % solutions is between 40 and 60 Pa·s; that for 11 solids mass % solutions is between 80 and 120 Pa·s, and that for 12 solids mass % solutions is between 120 and 180 Pa·s. These viscosities were measured at between 23 and 25° C. at a shear rate of either 0.4 s$^{-1}$ or 0.8 s$^{-1}$, depending on which rheometer was employed, and were found to vary slightly with the water content of the solutions.

in stronger, but more brittle fibers. Otherwise, the fibers spun from these two processes possess different properties.

Sample spinning conditions and related properties of the fiber spun into an EA coagulation bath, and stretched between the two godets while simultaneously being heated to between 70 and 100° C., are summarized in TABLE 2. When compared to the dopant-exchanged fibers summarized in TABLE 5, these fibers generally possess higher modulus and peak stress, and higher conductivity.

TABLE 2

Electrical and Mechanical Properties of As-Spun, Heated and Stretched, Acid Spun Polyaniline Fibers without Dopant Exchange for 10-12 mass % PANI.AMPSA.DCAA Spinning Solutions (150 μm spinneret).

Spinning Conditions

| Residence Time in EA(s) | Stretch Ratio and Heat Tube Conditions | Mechanical and Electrical Properties of As-Spun Fibers |
|---|---|---|
| 4-40 | 1.2-2:1; ~90° C., <10 s | Modulus: 1-2 GPa<br>Peak stress: 60-100 MPa<br>Extension at break: 10%-80%<br>Conductivity: 200-550 S/cm |

TABLE 2-continued

Electrical and Mechanical Properties of As-Spun, Heated and Stretched, Acid Spun Polyaniline Fibers without Dopant Exchange for 10-12 mass % PANI.AMPSA.DCAA Spinning Solutions (150 μm spinneret).

Spinning Conditions

| Residence Time in EA(s) | Stretch Ratio and Heat Tube Conditions | Mechanical and Electrical Properties of As-Spun Fibers |
|---|---|---|
| 5-40 | 2-2.4:1; ~90° C., <10 s | Modulus: 2-5 GPa<br>Peak stress: 100-150 MPa<br>Extension at break: 6%-10%<br>Conductivity: 550-1000 S/cm |
| 40-70 | 1.2-1.8:1; ~90° C., 10-20 s | Modulus: 1-2 GPa<br>Peak stress: 60-80 MPa<br>Extension at break: 40%-80%<br>Conductivity: 300-600 S/cm |
| 40-70 | 1.8-2.5:1; ~90° C., 10-20 s | Modulus: 2-4 GPa<br>Peak stress: 80-150 MPa<br>Extension at break: 6%-40%<br>Conductivity: 600-800 S/cm |
| 70-120 | 2.5:1; ~90° C., 20-30 s | Modulus: 3-5 GPa<br>Peak stress: 130-150 MPa<br>Extension at break: 6%-10%<br>Conductivity: 750-900 S/cm |

It is seen from TABLE 2 that:

(a) When a stretch ratio >2 is applied to the fiber, the flexibility of the fiber was reduced, and the extension at break was found to be <10%.

(b) The conductivity of as-spun fiber is greater than 500 S/cm for stretch ratios >2, and less than 500 S/cm for stretch ratios <2.

(c) A 25 s coagulation time is sufficient to coagulate the fiber when the spinneret diameter is <150 μm. A greater than 40 s EA bath resident time combined with a stretch ratio >2.3 has been found to generate high fiber modulus, high peak stress and high conductivity; however, the flexibility of the fiber was reduced, as the extension at break was found to be <10%.

Elemental analysis by energy dispersive x-ray spectroscopy (EDS) shows minimal extraction of AMPSA from the fiber during the described spinning process. For EDS analysis, the fiber sample is subjected to a high voltage electron beam that results in X-ray emission having energies characteristic of the elements present in the fiber. The amount of DCAA in the fibers was found to depend on the fiber residence time in the EA coagulation bath. The amount of residual DCAA affects the properties of aged fiber; that is, DCAA causes diminished fiber mechanical properties over time.

Having generally described the invention, the following EXAMPLES provide additional details thereof.

EXAMPLE 1

(i) Preparation of Spin Solutions Having 6 Mass % PANI.AMPSA$_{0.6}$ in DCAA:

Polyaniline (84.2 g, 0.93 moles of aniline repeat units) and 2-acrylamido-2-methyl-1-propanesulfonic acid (AMPSA, 115.8 g, 0.56 moles) were added to a 2 L plastic vessel containing a ceramic grinding media. The contents were milled for 2 h, and 1.0 g of water was added to the jar contents 30 min. after the milling process was commenced. 60.0 g of the PANI.AMPSA$_{0.6}$ powder was removed from the jar. Dichloroacetic acid (DCAA, 940 g) was placed in a vessel that was maintained at a temperature between 10 and 15° C. to remove heat generated during mixing process.

A Silverson SL4RT mixer having a duplex head was immersed in the DCAA and stirred at 1500-2000 rpm. The PANI.AMPSA$_{0.6}$ powder was added with stirring to the DCAA over a 3 h period to produce 1 kg of a 6 mass % solution. The temperature of the stirred solution was kept below 35° C. at all times to prevent gelling. After the powder addition, the solution was left to mix for 18 h before being degassed under a dynamic vacuum of ~50 mbar for 1 h.

(ii) Fiber Spinning of Spin Solutions Having 6 Mass % PANI.AMPSA$_{0.6}$ in DCAA:

The degassed solution was placed inside of a pressure vessel and 20 psi of nitrogen gas pressure was applied to the vessel to direct the solution to the gear pump. The solution was passed through a 230 μm pore filter prior to entering the gear pump. The Mahr & Feinpruf gear pump included 2 interlocking cogs which deliver 0.08 cm$^3$ of solution per revolution. The gear pump was adjusted to deliver 1.3 cm$^3$·min.$^{-1}$ of the spin solution. The solution was then passed through 230 and 140 μm pore filters before entering a 250 μm diameter spinneret (l/d=4). The spinneret was immersed in an ethyl acetate coagulation bath (wet spinning). The fiber was passed through the coagulation bath for about 1 m before being taken up on a pair of rotating (12.0 rpm; 6.2 m·min.$^{-1}$), 16.5 cm diameter godet drums immersed in a 1 M solution of phosphoric acid.

The fiber was then passed through a 1.2 m long heat tube maintained at a temperature of 90±10° C. and wound onto a second godet pair having the same diameter and the first pair, and turning at 15.6 rpm (8.1 m·min.$^{-1}$), thereby stretching the fiber with a 1.3:1 stretch ratio. The fiber was then collected on a 15 cm diameter bobbin turning at 18 rpm (8.5 m·min.$^{-1}$) and allowed to dry at ambient conditions for several weeks. About one month later, a section of the fiber was measured and found to have a diameter of 56±2 μm, a conductivity of 270±30 S·cm$^{-1}$, a peak stress of 108±9 MPa, a modulus of 4.1±0.3 GPa, and an extension at break of 20±4%.

EXAMPLE 2

Fiber Spinning Using the A Solution:

The fiber spin line included a gear pump and 3, post-pump, in-line filters (230, 140 and 60 μm pore). Two spinnerets were used: (a) 150 μm diameter with a length to diameter ratio (l/d) of 4; and (b) 100 μm in diameter with an l/d of 2. The fiber spinning solution was wet spun at ambient temperature (between 16 and 25° C.) into a coagulation bath, containing ethyl acetate (EA), although, as stated hereinabove, other coagulation liquids can be used. The fiber was then wound around a first pair of 0.165 m diameter godets which were either partially immersed in a chosen solution or simply rotated in air at ambient conditions. The fiber was subsequently passed through a 1.2 m long heat tube maintained at a temperature between 50 and 100° C., and wound around a second pair of godets turning between 1.2 and 2.7 times faster than the first godet pair. The second godet drums were not immersed in a solvent. The fiber was next wound onto a 0.150 m diameter bobbin using a Leesona fiber winder, and stored for at least 1 d under ambient conditions before mechanical and conductivity measurements were performed.

Some of the fibers were autoclaved for 2 h and their mechanical and electronic properties remeasured, then reprotonated (redoped) with 10 mass % methanesulfonic acid (MSA) dissolved in methanol. This process will be set forth in greater detail hereinbelow.

In a representative spin, with a 150 μm diameter spinneret and a pump flow rate was 0.10 cm$^3$·min.$^{-1}$, the residence time in the EA bath was 77 s. The heating tube temperature was 85° C., and 18.8 g of fiber having a diameter of 86±2 μm were collected over 150 min. The speed of the first godet was 3.0 rpm (~1.56 m·min$^{-1}$). The speed of rotation of the second godet was varied between 1.2 and 2.7 times faster than the first godet, in steps (3.6; 4.5; 5.4; 6.3; 7.2; and 8.1 rpm, as examples). Fiber samples were collected for several minutes at each speed for further measurements (fibers #1-#6). When the stretch ratio was higher than 3.0 for these fiber processing conditions, it was found that continuous fiber spinning became difficult, suggesting that the limit of the stretch ratio for these conditions is $\leq 3$ ($2^{nd}$ godet speed of rotation $\leq 9$ rpm).

In order to generate fibers having a diameter less than 50 µm, a 100 µm diameter spinneret was used. The flow rate was reduced to 0.03 cm³·min.⁻¹, and the first godet speed was reduced to 2.0 rpm, giving a residence time of 115 s in the EA bath. The heat tube was kept at 85° C., and the second godet was rotated 2.5 times faster (5.0 rpm) than the first godet (fiber #7).

For a flow rate of 0.10 cm³·min.⁻¹ and a first godet speed of rotation of 6.5 rpm, the residence time in EA was 38 s. The heat tube was kept at 85° C., and the second godet was rotated 2.5 times faster (16.3 rpm) (fiber #8).

For a flow rate of 0.20 cm³·min.⁻¹ and a first godet speed rotation of 13.3 rpm, the residence time in the EA bath was 17.3 s. In order to more completely remove the residual solvent in the spun fiber, the heat tube temperature was raised to 100° C. The stretch ratio was 2.5 ($2_{nd}$ godet speed of rotation of 33.3 rpm). The fibers produced under these conditions were broke during the spinning process.

TABLE 3 shows the variation of properties with increasing amounts of stretch between the godets for fibers #1-#6. The correlations between stretch ratio and mechanical and electrical properties of tested fibers are shown in FIGS. 1-5.

TABLE 3

Variation of Fiber Properties with Increasing Stretch Ratio.

| Speed ratio godet 2: godet 1 | Diameter (µm) | Density (g·cm⁻³), ±5% | Denier* | Conductivity (S·cm⁻¹) | Peak Stress (MPa) | Modulus (GPa) | Extn. @ break (%) |
|---|---|---|---|---|---|---|---|
| 1.2 (fiber #1) | 93 ± 2 | 1.68 | 103 | 335 ± 25 | 62 ± 5 | 0.6 ± 0.1 | 84 ± 8 |
| 1.5 (fiber #2) | 84 ± 2 | 1.59 | 79 | 445 ± 40 | 77 ± 5 | 1.1 ± 0.1 | 60 ± 4 |
| 1.8 (fiber #3) | 78 ± 2 | 1.57 | 68 | 525 ± 4 | 70 ± 8 | 1.4 ± 0.1 | 42 ± 10 |
| 2.1 (fiber #4) | 70 ± 2 | 1.59 | 55 | 630 ± 65 | 79 ± 2 | 2.1 ± 0.1 | 29 ± 10 |
| 2.4 (fiber #5) | 66 ± 2 | 1.55 | 48 | 750 ± 80 | 97 ± 5 | 2.6 ± 0.2 | 14 ± 4 |
| 2.7 (fiber #6) | 62 ± 2 | 1.60 | 43 | 810 ± 100 | 111 ± 3 | 2.9 ± 0.4 | 12 ± 4 |

*Denier is defined as the number of grams per 9000 m of fiber.

Figure 6:
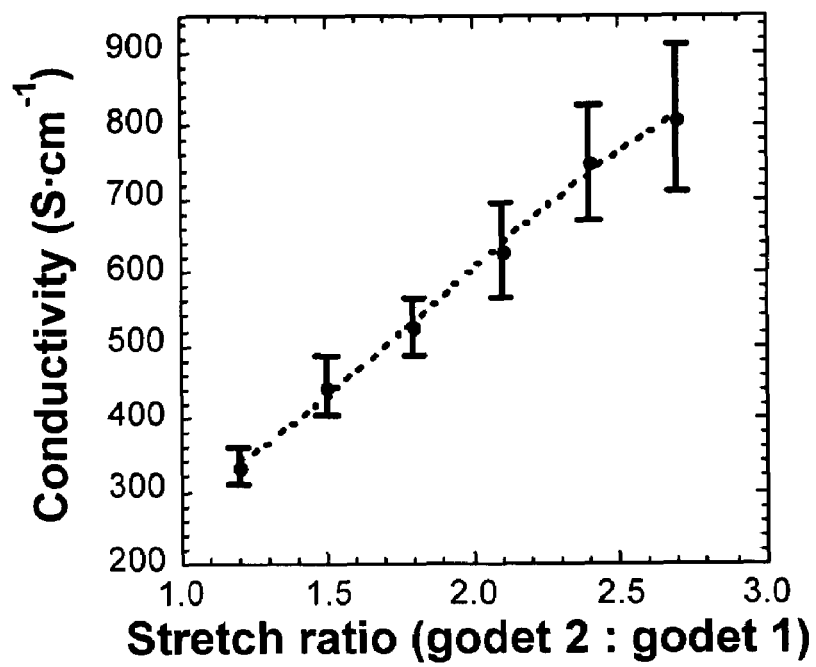
FIG. 6 is a graph of fiber conductivity as a function of stretch ratio for fiber spun from the A solution.
Figure 7:
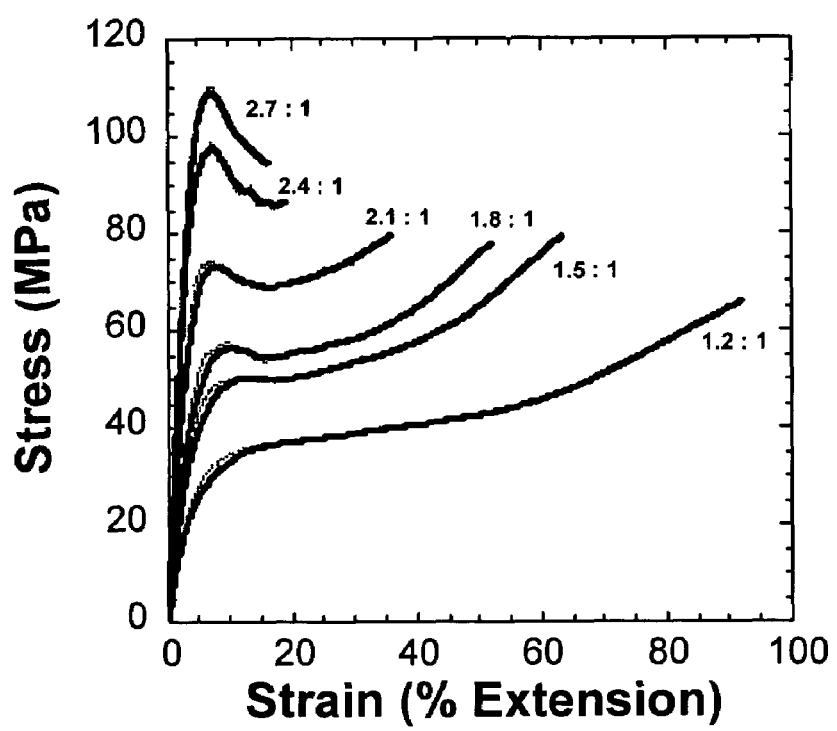
FIG. 7 is a graph of typical fiber stress/strain curves for as-spun fibers as a function of stretch ratio for fiber spun from the A solution.
Figure 8:
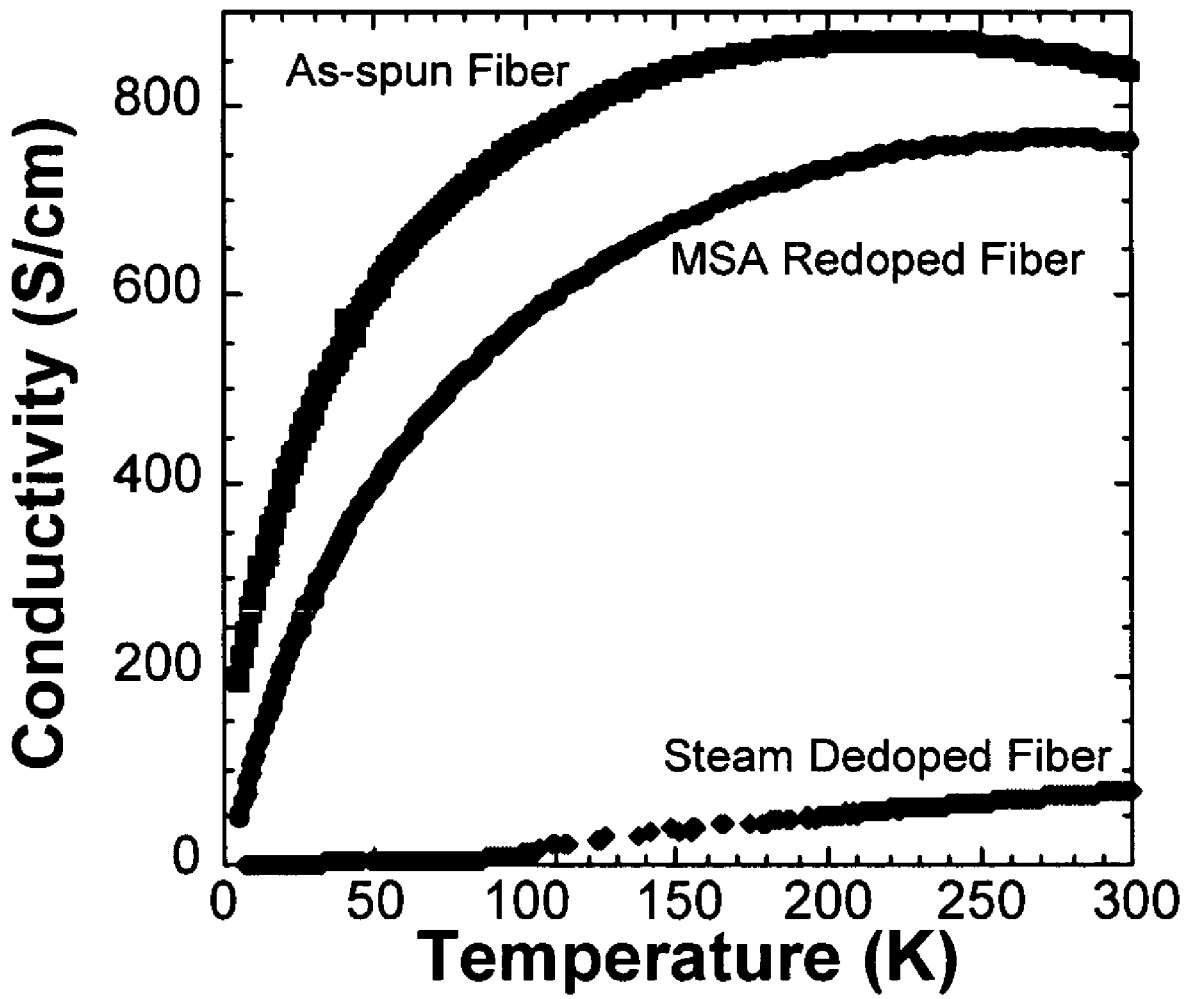
FIG. 8 is a graph of the conductivities as a function of temperature for as-spun AMPSA-doped polyaniline fiber, fiber dedoped using steam, and fiber redoped with methanesulfonic acid.

From TABLE 3 it may be observed that the diameter and the percent extension at break are seen to decrease proportionally with increasing stretch ratio which is suggestive that the fiber chains are increasingly aligned as the stretch ratio increases. See FIG. 2 and FIG. 3 hereof. As the stretch ratio increases, the denier decreases; however, the density (averaging 1.60±0.08 g·cm⁻³) does not change within experimental error (within 5%, TABLE 3). The peak stress, modulus and room temperature electrical conductivity of the fibers all increase with increasing stretch ratio, also indicating increasing polymer chain alignment. See FIG. 4, FIG. 5 and FIG. 6 hereof. The stress/strain curves for typical fiber samples for each stretch ratio (fibers #1-#6) are shown in FIG. 7 hereof.

Spinning was also performed using a 100 µm diameter spinneret at several flow rates. These fibers were stretched 2.5 times between the godets, and the resulting properties are set forth in TABLE 4 (fibers 7-9).

TABLE 4

Variation of Fiber Properties with Flow Rate.

| Pump rate (cm³·min⁻¹) | Temp heat tube (° C.) | 1st godet speed (rpm) | Diameter (µm) | Density (g·cm⁻³) | Denier | Conductivity (S·cm⁻¹) | Peak Stress (MPa) | Modulus (GPa) | Extn. @ break (%) |
|---|---|---|---|---|---|---|---|---|---|
| 0.03 (fiber #7) | 85 | 2.0 | 44 ± 2 | 1.49 | 20 | 790 ± 110 | 142 ± 6 | 4.1 ± 0.3 | 8.0 ± 1.3 |
| 0.1 (fiber #8) | 85 | 6.5 | 45 ± 2 | 1.47 | 21 | 790 ± 110 | 130 ± 3 | 3.2 ± 0.8 | 8.9 ± 3.6 |
| 0.2 (fiber #9) | 100 | 13.3 | 43 ± 2 | 1.57 | 21 | 960 ± 110 | 149 ± 4 | 4.5 ± 0.6 | 5.7 ± 0.5 |

The fiber residence times for these three runs (from top to bottom) decrease from 115 s to 36 s, and finally to 17 s. There is little difference between these fibers and fiber #6 (TABLE 3), although the diameter of these samples is smaller than that of fiber #6 because a smaller diameter spinneret was used. These fibers are observed to have slightly higher peak stress, and modulus, while the percent extension at break is lower. The conductivities are similar to that for fiber #6. Note that the fiber diameters for fibers #7-#9 are between 43 and 45% of the spinneret diameter, similarly to those for fiber #5 and fiber #6 from TABLE 3 (stretched at 2.4 and 2.7 times, respectively) which are between 44 and 41% of the spinneret diameter respectively. However, the densities of fiber #7 and fiber #8, spun at 0.03 and 0.10 cm$^3$·min.$^{-1}$, are slightly lower than that for fiber #9, which is similar to the values in TABLE 3. Fiber #9 of TABLE 4 is seen to have the highest conductivity which may be due to additional fiber stretching in the coagulation bath.

D. Dopant Manipulation (1) Spin Line Processing:

Since the performance of conducting-polymer-based devices is known to be dependent on the properties of dopant anions, for certain applications it may be desirable to replace the AMPSA and DCAA present in the fibers as a result of the acid-spinning process with other dopants. Dopants present in polyaniline fibers can be partially or totally replaced with selected dopants during: (a) the spinning process; (b) post-spinning dopant manipulation; and (c) fiber conversion to the insulating EB form (dedoped) as part of the spinning process, followed by redoping with the selected acid. The three approaches generated the same electrical and mechanical properties in the doped form of the fibers.

As stated hereinabove, removal of DCAA from the as-spun fiber is advantageous since residual DCAA has been found to slowly degrade the mechanical properties of polyaniline fiber, and because it is a hazardous compound.

As an example of a dopant-exchange process for polyaniline fibers prepared from a 12 mass % solution of PANI.AMPSA dissolved in DCAA, the first godet bath was filled with an aqueous solution of 1 M phosphoric acid. Phosphoric acid was chosen because it imparts good thermal stability to the doped fiber, and is a relatively inexpensive acid. A residence time of 1 min. in the dopant exchange solution (at 1 M H$_3$PO$_4$) was found to be sufficient to replace AMPSA with phosphoric acid. Other acids are expected to be suitable for replacing the AMPSA and DCAA molecules in the as-spun polyaniline fiber in a similar manner.

The residence time in the coagulation bath was chosen such that acids having low pKa values will replace the AMPSA dopant molecules in the fiber. By contrast, the majority of DCAA molecules present in the fiber from the spinning solution were found to be removed in the ethyl acetate coagulation bath (note that AMPSA has minimal solubility in EA). TABLE 5 provides a summary of spinning conditions and the resulting mechanical and electrical properties of fibers after dopant exchange using phosphoric acid.

TABLE 5

Electrical and Mechanical Properties of As-Spun, Heated, Stretched and Washed, Acid Spun Polyaniline Fibers without Dopant Exchange for 10-12 mass % PANI.AMPSA.DCAA Spinning Solutions (~150 μm spinneret).

| Spinning Conditions | | | |
|---|---|---|---|
| Residence Time in EA (s) | Residence Time in 1M H$_3$PO$_4$ Aqueous Solution (s) | Stretch Ratio and Heat Tube Conditions | Mechanical and Electrical Properties of As-Spun Fibers |
| 20-25 | 20-40 | 1.1-1.5:1; ~90° C., 5-10 s | Modulus: 1.5-2.5 GPa Peak stress: 60-100 MPa Extension at break: 20%-60% Conductivity: 200-350 S/cm |
| 6-25 | 40-60 | 1.1-1.3:1; ~90° C., 5-10 s | Modulus: 1-1.5 GPa Peak stress: 60-100 MPa Extension at break: 40%-60% Conductivity: 200-400 S/cm |

The results for the composition of as-spun polyaniline fibers that have been processed with and without a H$_3$PO$_4$ dopant exchange step are summarized in TABLE 6. The 56 s residence time in the first godet bath containing the phosphoric acid solution resulted in substantially all of the AMPSA and DCAA in the solid fiber being replaced with phosphoric acid. The dopant exchanged fiber was found to have similar electrical and mechanical properties to the control fiber.

The stretch ratio for these dopant exchanged fibers was kept below 1.5 during the process, since higher stretching ratios result in the fiber breaking between the two godet baths. This is likely the result of the removal of the AMPSA which acts as a plasticizer for polyaniline fibers. Generally, when a phosphoric acid dopant exchange step is introduced after the coagulation bath, the as-spun fibers are more flexible than the unexchanged fibers of TABLE 2.

EXAMPLE 3

Dopant Exchange During Fiber Spinning:

As an example of how dopant exchange procedure affects the composition, electrical and mechanical properties of doped polyaniline fibers produced under the same spinning conditions, fiber was spun from solution B at a rate of 0.60 cm$^3$·min$^{-1}$ (0.76 g·min$^{-1}$) into an EA coagulation bath with a coagulation length of 4.6 m which corresponds to a residence time of 38 s. The first godet pair was rotated 15.0 rpm and the second godet pair was rotated 1.2 times faster. The temperature of the 1.2 m heat tube placed between the godet baths was maintained at 90° C. The first godet was immersed in a 1 M aqueous phosphoric acid solution in order to exchange dopants during the spin process. The residence time of the fiber in the first godet bath was 56 s. The composition of both as-spun polyaniline fibers were assessed using EDS. With the use of an empty first godet bath, control fibers were spun under the same conditions without dopant exchange.

TABLE 6

Mechanical and Electrical Properties, and Composition of Polyaniline Fibers that have been Processed with and without a $H_3PO_4$ Dopant Exchange Step.

| Dopant Exchange | Diameter (μm) | Conductivity (S·cm$^{-1}$) | Peak Stress (MPa) | Modulus (GPa) | Extn. @ break (%) | Composition |
|---|---|---|---|---|---|---|
| No | 72 ± 2 | 300 ± 10 | 55 ± 2 | 1.6 ± 0.3 | 20 ± 15 | PANI•AMPSA$_{0.58}$•DCAA$_{0.18}$ |
| Yes | 70 ± 4 | 315 ± 40 | 69 ± 2 | 2.1 ± 0.2 | 26 ± 5 | PANI•H$_3$PO$_4$ $_{0.70}$ AMPSA$_{0.02}$•DCAA$_{0.02}$ |

Residence times in the EA coagulation bath exceeding 38 s were subsequently found to produce weaker fibers. Residence times in the EA coagulation bath between 6 and 25 s gave a good combination of electrical and mechanical properties when a $H_3PO_4$ dopant exchange step is employed.

EXAMPLE 4

Dedoping During Fiber Spinning:

In another embodiment of the present invention for removing acid dopants from spun fibers (AMPSA and DCAA), the polyaniline was dedoped into its EB oxidation state. This was achieved by immersing the first godet in an ammonium hydroxide solution (317 g of 30% NH$_4$OH in 22 L of water) having a pH of 10.8. To spin the fiber, the C spin solution was directed through a twin-hole spinneret (150 μm diameter) with a gear pump flow rate of 0.60 cm$^3$·min$^{-1}$. The residence time in the coagulation bath was 56 s, with the first godet being rotated at 10.5 rpm. In order to verify the effect of base washing time on the mechanical properties, the residence time of the fiber in the ammonium hydroxide was varied. A first fiber sample was collected with the fiber undergoing 20 turns around the first godets, a second fiber underwent 5 loops, and a third sample made a single loop through the first godet bath. The heat tube was set to 80° C. and the second godet was rotated 1.2 times faster (12.6 rpm) than the first godet, and the fiber was collected on a bobbin. The effect of residence time in the first godet bath on the fiber properties is summarized in TABLE 7.

Based on EDS analysis of the as-spun fibers, a 3 s residence time in the first godet was found to be sufficient to remove approximately 90% of the DCAA and 65% of the AMPSA from the fiber. The fiber entering the first godet bath typically has a composition of PANI.AMPSA$_{0.58}$.DCAA$_{0.91}$. However, due to DCAA and coagulant EA trapped in the as-spun fiber, the fiber was soft and weak. As more solvent and coagulant were removed, the fiber was found to have a higher modulus and became more brittle. The conductivity of the fibers that resided in the first godet bath between 15 s and 60 s indicates that they were essentially dedoped, as their resistance was greater than 20 MΩ. The fiber spun with a residence time of 3 s in the first godet bath, has a conductivity of 10±4 S·cm$^{-1}$.

EXAMPLE 5

(2) Post-Spin Line Treatment of Fibers:

(i) Steam Dedoping/Redoping:

Fiber #9, processed in accordance with EXAMPLE 2 (TABLE 4), which demonstrated high values for peak stress, modulus, and room temperature conductivity, was next dedoped with steam at 20 psi for 2 h (fiber #10) and then reprotonated by soaking in 10% methanesulfonic acid (MSA) in methanol for 19 h (fiber #11). The as-spun fiber was also washed in water for 20 h as a control for the steam dedoped material (TABLE 8).

TABLE 7

Effect of Residence Time in a pH 10.8 First Godet Bath on the Composition and Electrical Properties of the Resulting Dedoped Polyaniline Fiber.

| Residence time in first godet (s) | Diameter (μm) | Peak Stress (MPa) | Modulus (GPa) | Extn. @ Break (%) | Composition |
|---|---|---|---|---|---|
| 60 | 52 ± 2 | 204 ± 7 | 7.6 ± 0.3 | 3.2 ± 0.2 | PANI•AMPSA$_{0.02}$•DCAA$_{0.01}$ |
| 15 | 60 ± 2 | 167 ± 6 | 5.7 ± 1.2 | 8.2 ± 5.4 | PANI•AMPSA$_{0.08}$•DCAA$_{0.05}$ |
| 3 | 84 ± 2 | 43 ± 3 | 1.3 ± 0.2 | 51 ± 27 | PANI•AMPSA$_{0.20}$•DCAA$_{0.10}$ |

TABLE 8

Fiber #9 Properties after Steam Dedoping (fiber #10), Redoping (fiber #11), or Immersion in Water (fiber #12).

| Post treatment | Diameter (μm) | Density (g·cm$^{-3}$) | Denier | Conductivity (S·cm$^{-1}$) | Peak Stress (MPa) | Modulus (GPa) | Extn. @ break (%) |
|---|---|---|---|---|---|---|---|
| As-spun (fiber #9) | 43 ± 2 | 1.57 | 21 | 960 ± 110 | 142 ± 6 | 4.1 ± 0.3 | 8.0 ± 1.3 |
| Steam dedoped (fiber #10) | 31 ± 2 | 1.24 | 8.4 | 160 ± 40 | 663 ± 53 | 21 ± 5 | 5.4 ± 3.5 |
| Redoped (fiber #11) | 36 ± 2 | 1.65 | 15 | 1070 ± 180 | 236 ± 15 | 7.7 ± 1.5 | 5.4 ± 1.2 |
| Immersed In Water (fiber #12) | 40 ± 2 | 0.95 | 11 | 0.4 ± 0.2 | 279 ± 27 | 6.8 ± 0.4 | 12 ± 2 |

TABLE 8 shows that the steam-dedoped fiber has the largest peak stress and modulus among the polyaniline fiber measured. This peak stress is approximately 6 gpd (grams per denier), and the modulus is about 190 gpd. By contrast, the strongest polyacrylonitrile (PAN) fibers produced by gel spinning PAN having a $M_w$ value of 500,000 g·mol$^{-1}$ has a peak stress of 7-9 gpd and a modulus of 100-125 gpd, with about 7% extension at break. The MSA-protonated polyaniline fiber conductivities are higher than those for the as-spun AMPSA doped fibers (1070 vs. 960 S·cm$^{-1}$), with improved peak stress and modulus values when compared to the as-spun AMPSA doped fiber.

The temperature dependence on the dc conductivity provides useful information about the microscopic structure of the materials. PANI.AMPSA$_{0.6}$ fibers are a highly conductive system with values of the conductivity varying from 50 S·cm$^{-1}$ for unstretched materials to 1200 S·cm$^{-1}$ for stretch, oriented materials. Samples were mounted in the controlled environment of a cryostat. The cryostat was evacuated to approximately 10$^{-4}$ Torr, and the temperature inside the chamber was brought to 4K using liquid helium. Temperature was controlled to within 0.5% as the temperature was raised to 350K from 4 K. Conductivity (inverse of volume resistivity) as a function of temperature for fiber samples was measured using ASTM procedures (Designation No. D4496-87).

FIG. 7 is a graph of the temperature dependence of the conductivity for as-spun, steam dedoped, and fibers redoped with MSA (fibers # 9, 10 and 11, respectively). The conductivity of the autoclaved fiber is seen to drop by five orders of magnitude at 4 K, while subsequent redoping of the fiber substantially restored the fiber conductivity, although with an altered conductivity profile.

EXAMPLE 6

(ii) Dedoping of Acid-Spun Solid and Hollow Fibers:
  (a) Solid Fibers:
  A dedoping procedure for removing dopants (AMPSA and DCAA, as examples) from the as-spun fibers which results in fibers having low room-temperature conductivity is now described. Essentially all of the dopants are removed from the as-spun fiber without substantially changing the mechanical properties of the fiber. Fibers were dedoped by placing them in contact with de-ionized water or with a 0.1 M solution of NH$_4$OH, or by exposing the fibers to steam at 15 psi in an autoclave.

AMPSA-doped polyaniline fibers (70 μm) were spun from the 6 mass % polyaniline/AMPSA/DCAA solutions described in EXAMPLE 1, hereinabove. For polyaniline fibers to be dedoped using water or a basic solution, 1 m lengths of fiber were submerged in 200 mL of either de-ionized water or 0.1 M NH$_4$OH aqueous solution for between 15 min. and 3 h. The high volatility of ammonium hydroxide compared with sodium hydroxide permits its complete removal from the fiber; it was found that use of sodium hydroxide results in the incorporation of sodium ions into the resulting fiber. For the steam-processed fibers, substantial fiber dedoping required that the fibers be exposed to approximately 15 psi of steam for between 1 and 8 h. The fibers were then dried overnight under ambient conditions before the room temperature conductivity, elemental analysis and tensile properties of the dedoped fibers were measured.

The effectiveness of the dedoping method was determined by measuring the room temperature conductivity of the polyaniline fiber. The conductivity of the as-spun fiber was 390 S·cm$^{-1}$. TABLE 9 summarizes the room temperature conductivity for the water and base soaked fibers, and the fibers exposed to steam at 15 psi for different processing times. The resistance of the base-soaked fibers was >30 MΩ.

TABLE 9

Conductivity of Polyaniline Fiber after Dedoping.

| | Conductivity (S·cm$^{-1}$) | | |
|---|---|---|---|
| Dedoping Time | Fiber Exposed to Water | Fiber Exposed to 0.1M NH$_4$OH | Fiber Exposed to Steam |
| 15 min. | 0.21 | <4 × 10$^{-4}$ | X |
| 30 min. | 0.17 | <4 × 10$^{-4}$ | X |
| 1 h | 7.5 × 10$^{-2}$ | <4 × 10$^{-4}$ | 38 |
| 2 h | 5.5 × 10$^{-2}$ | <4 × 10$^{-4}$ | 1.9 |
| 3 h | 9.8 × 10$^{-3}$ | <4 × 10$^{-4}$ | 0.25 |
| 5 h | X | X | 0.22 |
| 8 h | X | X | 0.12 |

X - experiment not performed.

The results of TABLE 9 show that for any given dedoping time, fibers exposed to the 0.1 M aqueous NH$_4$OH solution display the lowest conductivity. The conductivity of the base-dedoped fiber dropped rapidly when compared with that for the fibers dedoped in water or by steam. Dedoping the polyaniline fibers using the autoclave procedure is a slow process for extracting the dopants from the fiber. Dedoping treatments also caused the fiber diameter to decrease from 70 μm for the as-spun fiber to 50 μm for the fiber having the lowest conductivity. The rate of change of the fiber diameter follows the loss of conductivity, with the diameter decreasing rapidly for the base-dedoped fibers compared with the decrease for the autoclaved fibers.

EDS spectra of the as-spun and dedoped fibers recorded at a beam acceleration voltage of 10 kV revealed that carbon, nitrogen, oxygen, phosphorus, sulfur and chlorine were present in the fiber. Hydrogen atoms cannot be detected by this technique. The dedoped fibers were originally spun into an EA coagulation bath and the first godet was immersed in a 1.0 M aqueous solution of phosphoric acid. This resulted in the partial extraction of AMPSA molecules from the doped polyaniline fiber since AMPSA is highly soluble in aqueous solutions, and in the replacement of the AMPSA with phosphoric acid molecules.

The EDS spectra of the as-spun fiber showed its composition to be $PANI \cdot AMPSA_{0.18} DCAA_{0.65} H_3PO_{4\,0.11}$. The mole % of key elements found in dopant molecules as determined by EDS analysis of the dedoped fibers is shown in TABLE 10 to TABLE 12 for the fibers exposed to water, the fibers exposed to base, and the fibers exposed to steam at 15 psi, respectively.

TABLE 10

Composition of Elements Found in the Dopant Molecules for Polyaniline Fibers Dedoped using Water.

| Time of Dedoping | Mol % Sulfur in fiber | Mol % Phosphorus in fiber | Mol % Chlorine in fiber |
|---|---|---|---|
| 15 min. | 0.73 | 0.19 | 2.6 |
| 30 min. | 0.74 | 0.16 | 2.4 |
| 1 h | 0.66 | 0.12 | 2.2 |
| 2 h | 0.66 | 0.11 | 1.7 |
| 3 h | 0.64 (36% AMPSA removed) | 0.10 (84% $H_3PO_4$ removed) | 1.6 (77% DCAA removed) |

Final Fiber Composition $PANI \cdot AMPSA_{0.05} DCAA_{0.07} H_3PO_{4\,0.01}$

TABLE 11

Composition of Elements Found in the Dopant Molecules for Polyaniline Fibers Dedoped Using 0.1M $NH_4OH$.

| Time of Dedoping | Mol % Sulfur in fiber | Mol % Phosphorus in fiber | Mol % Chlorine in fiber |
|---|---|---|---|
| 15 min. | 0.52 | 0.04 | 0.34 |
| 30 min. | 0.37 | 0.05 | 0.17 |
| 1 h | 0.39 | 0.04 | 0.16 |
| 2 h | 0.31 | 0.05 | 0.14 |
| 3 h | 0.31 (69% AMPSA removed) | 0.04 (94% $H_3PO_4$ removed) | 0.15 (98% DCAA removed) |

Final Fiber Composition $PANI \cdot AMPSA_{0.02} DCAA_{0.01}$

TABLE 12

Composition of Elements Found in the Dopant Molecules for Polyaniline Fibers Dedoped Using Steam.

| Time of Dedoping | Mol % Sulfur in fiber | Mol % Phosphorus in fiber | Mol % Chlorine in fiber |
|---|---|---|---|
| 1 h | 0.80 | 0.08 | 1.8 |
| 2 h | 0.82 | 0.03 | 1.2 |
| 3 h | 0.80 | 0.04 | 1.0 |
| 5 h | 0.68 | 0.05 | 0.79 |
| 8 h | 0.58 (42% AMPSA removed) | 0.07 (89% $H_3PO_4$ removed) | 0.29 (96% DCAA removed) |

Final Fiber Composition $PANI \cdot AMPSA_{0.04} DCAA_{0.01}$

The above results show that the dedoping methods employed are effective for removing the DCAA and phosphoric acid from the as-spun fiber. However, not all of the AMPSA molecules are extracted from the fiber. The fibers immersed in a 0.1 M aqueous bath containing $NH_4OH$ showed the lowest sulfur content of the three methods for a given dedoping time. Additionally, the fiber immersed in base for 15 min. possessed lower sulfur content than the fiber immersed in water for 3 h, and the fiber steam treated for 8 h. Comparing the sulfur content for the dedoped fibers to their conductivity values listed in TABLE 9 indicates that the higher conductivity for fibers exposed to water and steam arises from a higher residual AMPSA doping level in these fibers. It is believed by the present inventors that the residual AMPSA (3-5% of the AMPSA from the original spinning solution) may have been cross-linked during the fiber spinning process and, therefore, resisted being extracted by these dedoping procedures.

The tensile properties of some of the dedoped fibers listed in TABLE 8 were measured to determine how dedoping procedures affect the mechanical properties of the fibers. Fibers were stretched at 10 mm·min.$^{-1}$ using a 1 lb load cell. The results are summarized in TABLE 13, in addition to the tensile properties of the as-spun fiber. The dedoped fibers listed in TABLE 13 display improved tensile strength and modulus when compared to the as-spun fiber, but are substantially more brittle. While the fibers soaked in base and in de-ionized water showed similar mechanical properties, these properties were inferior to those of the autoclaved fibers. Moreover, longer exposure time to the steam results in fibers having a higher modulus; however, the fiber becomes more brittle. It is believed by the present inventors that this is due to the more complete removal of the AMPSA and DCAA dopant molecules from the fiber, which are known plasticizers for polyaniline.

TABLE 13

Mechanical Properties of the Dedoped Fibers.

| Fiber | Peak Stress (MPa) | Modulus (GPa) | Extn. @ Break (%) |
|---|---|---|---|
| As-spun | 170 | 5.8 | 19 |
| Dedoped Fibers | | | |
| 2 h steam exposure | 430 | 11.0 | 12 |
| 8 h steam exposure | 420 | 12.3 | 8 |
| 30 min. in 0.1M $NH_4OH$ | 280 | 9.5 | 4 |
| 30 min. in water | 250 | 9.0 | 4 |

In summary, immersing the fibers in a 0.1 M aqueous solution of $NH_4OH$ produced fibers having the lowest conductivity and the lowest concentration of the as-spun dopants in the dedoped fiber. Additionally, this process is substantially faster than exposing the fibers to either de-ionized water to steam at 15 psi. Exposing the fibers to base beyond 30 min. was observed to have only a small effect on the elemental composition of the fiber. An advantage of exposing the as-spun fibers to steam is that this procedure produces dedoped fibers with superior mechanical properties than fibers dedoped by immersion. The steam dedoped fibers showed the slowest rate of removal of AMPSA from the fiber.

(b) Hollow Fibers:

Doped, hollow polyaniline fibers were spun using a 55-28-16 (0.055 in.×0.028 in.×0.016 in.) spinneret. The spinneret included two concentric cylinders having openings at both ends. The polyaniline spinning solution was extruded through the gap between the outer diameter of the inner cylinder and the inner diameter of the outer cylinder, while a bore fluid was simultaneously pumped through the inside of the inner cylinder, thereby generating the hollow fiber. For the 55-28-16 spinneret, the diameter of the exit hole of the outer cylinder was 0.055 in., the outer diameter of the exit hole of the inner cylinder was 0.028 in., and the inner diameter of the exit hole of the inner cylinder was 0.016 in. The spinneret had an I/d ratio of 1. The dimensions of this spinneret and its I/d ratio, and the spinneret dimensions and I/d ratios set forth hereinabove should not be considered as a limitation on the scope of the present invention. Solution D was delivered to the spinneret after passing through 3 in-line filters (230, 140, and 90 μm pores) at a flow rate of 1.5 cc·min$^{-1}$ using a gear pump, while acetone bore fluid was delivered to the spinneret at a flow rate of 0.5 cc·min$^{-1}$ using a pump. Any of the coagulants listed in Section C hereof can be used as a bore fluid. An ethyl acetate coagulation bath was used to precipitate the polyaniline solution. After leaving the coagulation bath, the hollow fiber was directed around a pair of 0.165 m diameter godets drums rotating at 2 rpm. The fiber then passed through a 1.2 m long heat tube maintained at 70° C., as heating the fiber enables the fiber to be stretched by a second pair of godets rotating 1.2 times faster than the first godet. Neither set of godets was immersed in a solvent. The fiber was subsequently wound onto a 0.150 m diameter bobbin of a Leesona fiber winder.

Hollow fibers were contacted with a 0.1 M solution of ammonium hydroxide for 1 h for dedoping. However, due to the larger wall thickness of the acid-processed hollow fibers (~200 μm), a longer dedoping time may be more effective. Approximately 100 mL of the ammonium hydroxide solution for every gram of the as-spun hollow fiber was used. The hollow fibers were then soaked in deionized water for 1 h, which assisted in removing the ammonium hydroxide solution from the hollow fiber. Fiber #19 in TABLE 14 was subsequently contacted with methanol for 18 h after being dedoped with the ammonium hydroxide solution.

After immersing the hollow fibers in the ammonium hydroxide solution for 1 h, the color of the fiber was observed to change from dark blue to bronze. The effect of different dedoping methods on the composition of the dedoped fiber was also assessed using energy dispersive X-ray spectroscopy (EDS). The results for the EDS analysis and resistance measurements for seven replicate dedoped acid-processed hollow fibers are summarized in TABLE 14. The DCAA content for all of these dedoped hollow fibers was at the level of the background noise, while AMPSA was found in several of the hollow fibers, especially fibers #14-#16 of TABLE 14. The high AMPSA content in these fibers is likely responsible for the lower resistance values measured for these fibers. Additionally, scanning electron microscope examination of the cross sections of these fibers indicate that the bore of the hollow fiber collapsed, thereby making it difficult for the ammonium hydroxide solution to penetrate the inside of the fiber.

TABLE 14

EDS Analysis and Resistance Data for Acid-Processed Hollow Fibers Dedoped Using Ammonium Hydroxide.

| Dedoped Fiber # | Mole ratio of AMPSA molecules to N atoms in PANI | Mole ratio of DCAA molecules to N atoms in PANI | Resistance/Length of fiber ($\Omega \cdot cm^{-1}$) |
| --- | --- | --- | --- |
| 13 | 0.03 | 0.00 | >20 MΩ |
| 14 | 0.06 | 0.01 | 14 MΩ |

TABLE 14-continued

EDS Analysis and Resistance Data for Acid-Processed Hollow Fibers Dedoped Using Ammonium Hydroxide.

| Dedoped Fiber # | Mole ratio of AMPSA molecules to N atoms in PANI | Mole ratio of DCAA molecules to N atoms in PANI | Resistance/Length of fiber ($\Omega \cdot cm^{-1}$) |
| --- | --- | --- | --- |
| 15 | 0.08 | 0.01 | 7 MΩ |
| 16 | 0.06 | 0.01 | 8 MΩ |
| 17 | 0.00 | 0.01 | >20 MΩ |
| 18 | 0.01 | 0.00 | >20 MΩ |
| 19 | 0.00 | 0.00 | >20 MΩ |

EXAMPLE 7

Figure 9A:
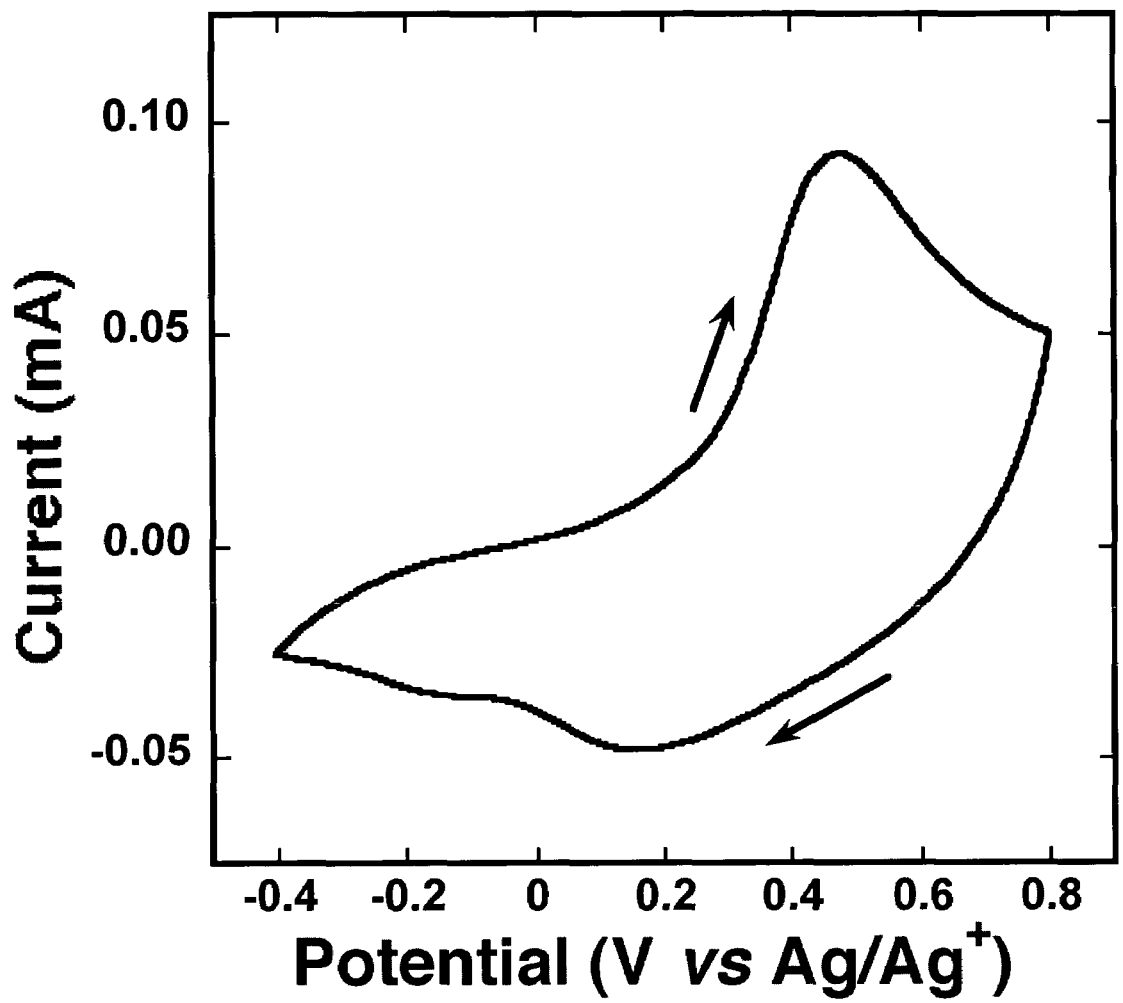
Figure 9B:
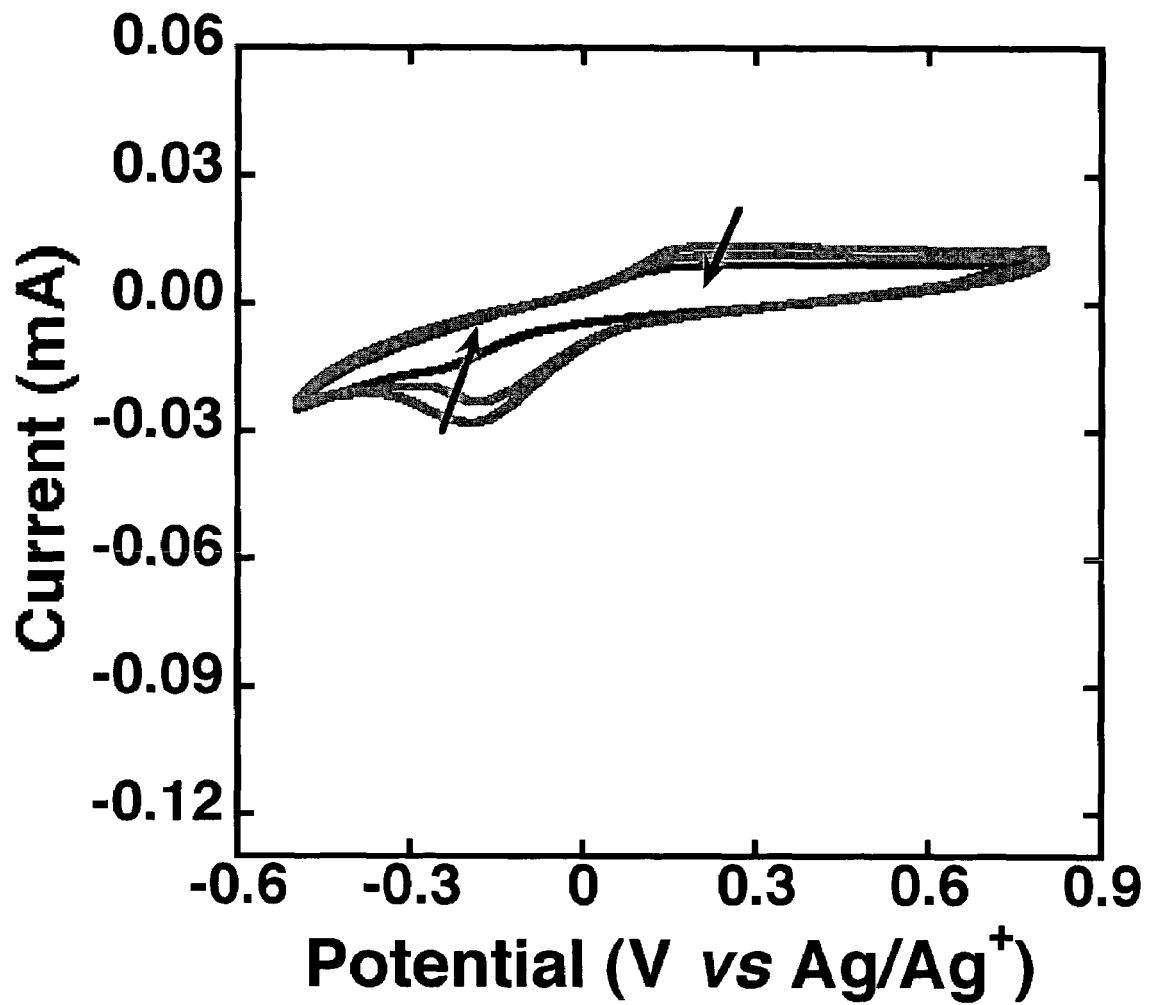
FIG. 9b is a cyclic voltammogram of polyaniline fibers obtained in the ionic liquid electrolyte, 1-butyl-3-methylimizadolium hexafluorophosphate at a scan rate of 5 mV.s$^{-1}$ for a 10 mm length of the as-spun fiber doped with AMPSA.

(iii) Redoping of Solid and Hollow Fibers:
(a) Redoping Solid Fibers with Triflic Acid:

To achieve minimal AMPSA and DCAA content, high room-temperature conductivity, good mechanical properties, and high electroactivity and electrochemical actuation in organic and ionic liquid electrolytes, dedoped fibers were redoped with triflic acid due to its small ionic radius and its high solubility in organic solvents. The enhanced electroactivity of the triflic acid electrochemically redoped fiber can be clearly seen in the order of magnitude increase in the cyclic voltammogram of the fiber shown in FIG. 9(a), when compared with the cyclic voltammogram shown in FIG. 9(b) for the as-spun, AMPSA-doped fiber.

One meter lengths of polyaniline fiber were first dedoped for 30 min. using a 0.1 M aqueous solution of NH$_4$OH as described EXAMPLE 6a hereinabove. The dedoped polyaniline fibers were subsequently immersed in 200 mL of either a 0.1 M or a 1.0 M triflic acid solution for a chosen period of time. The redoped fibers were dried overnight under atmospheric conditions before their room temperature conductivity, elemental analysis and tensile properties were measured.

The room temperature conductivity, mechanical properties and fiber composition of the polyaniline fibers redoped with triflic acid under different conditions are summarized in TABLE 15. Both the conductivity and fiber composition are seen to be influenced by the redoping time and the triflic acid concentration. As the concentration of the triflic acid is increased from 0.1 M to 1.0 M, the redoping time required to achieve the maximum observed conductivity is decreased from 24 h to 16 h. The maximum conductivity obtained for the redoped fiber is lower than that for the as-spun fiber (310 S·cm$^{-1}$ v. 390 S·cm$^{-1}$). Longer doping times resulted in more triflic acid being incorporated into the fiber as determined by EDS analysis at a beam acceleration voltage of 10 kV, which explains the increase in the conductivity.

Figure 10:
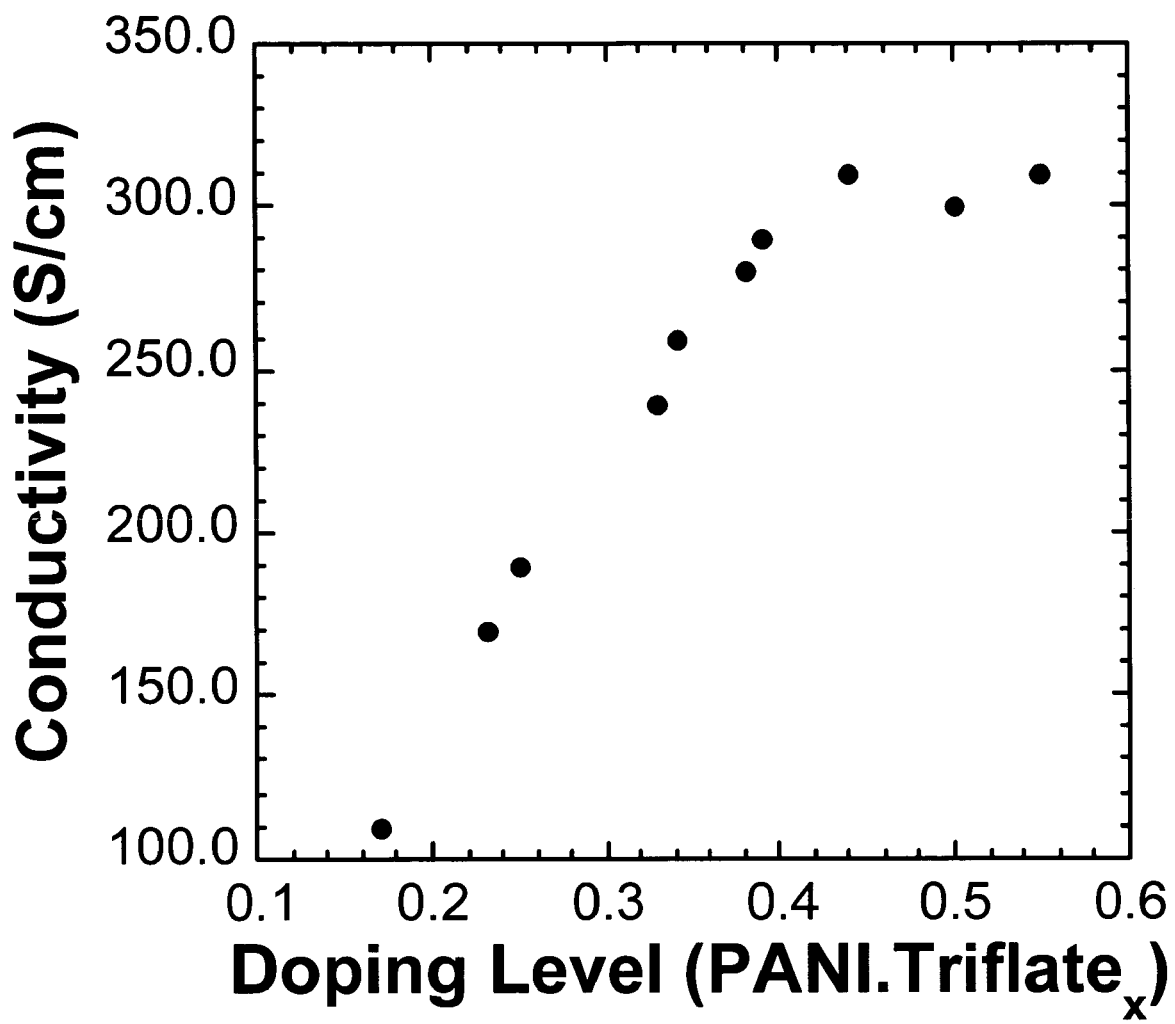
FIG. 10 is a graph of doping level as a function of conductivity of the polyaniline fibers redoped with triflic acid.
Figure 11:
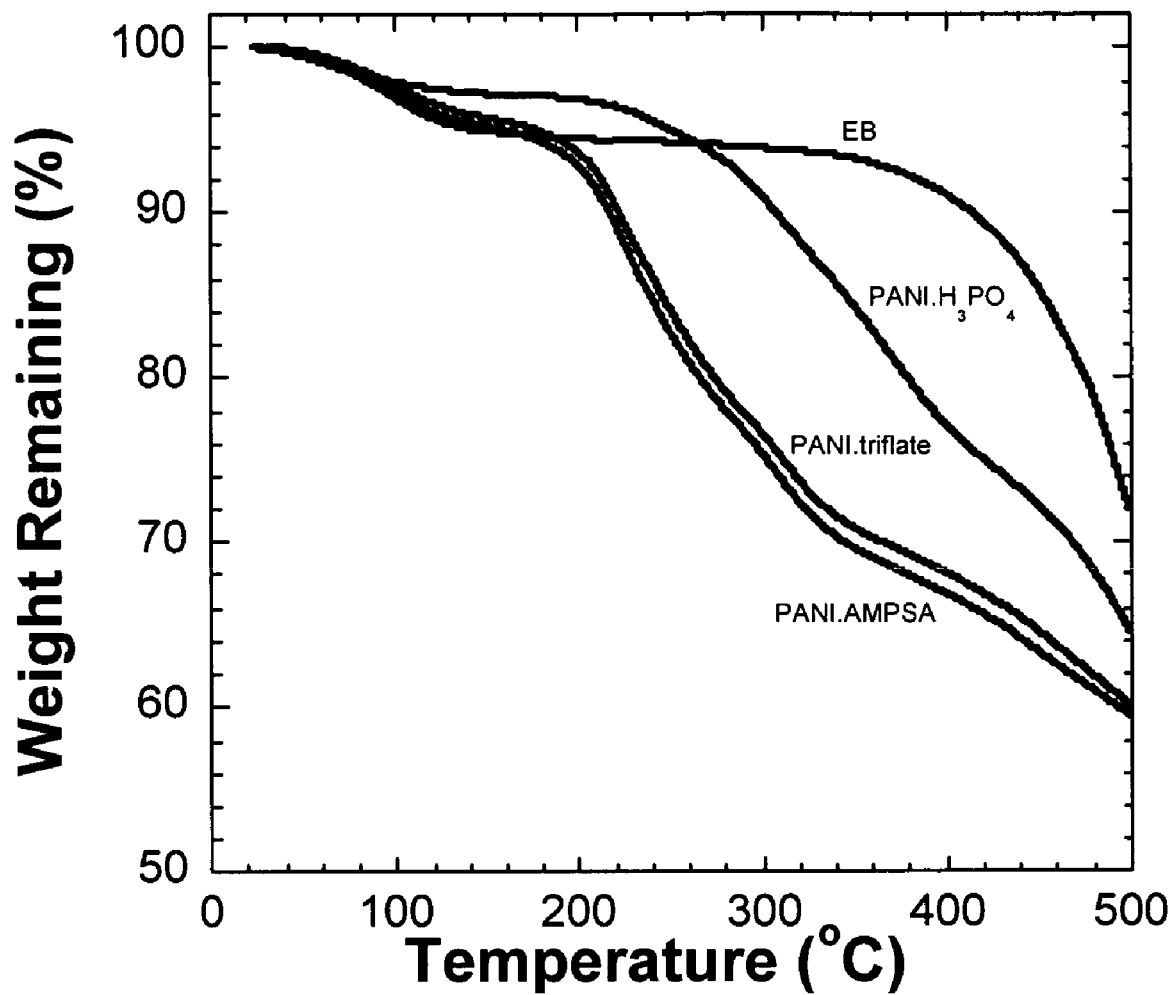
FIG. 11 is a graph showing percent weight loss as a function of temperature for as-spun, AMPSA-doped polyaniline fiber (PANI.AMPSA fiber), for the as-spun, AMPSA-doped polyaniline fiber (PANI.AMPSA), after dedoping the as-spun fiber with ammonium hydroxide (EB fiber), and for the dedoped fiber redoped with phosphoric acid (PANI.$H_3PO_4$ fiber) and redoped with triflic acid (PANI.triflate fiber).

The fiber diameter increased from 50 μm for the dedoped fiber to 62 μm for the redoped fiber. This diameter is lower than the diameter of the as-spun fiber (70 μm), which reflects the smaller volume of the triflate anion compared to the AMPSA anion. From the data in TABLE 15, the relationship between the doping level, as determined by EDS analysis, and the room temperature conductivity of the fiber is plotted in FIG. 10 hereof. The conductivity increases with doping level, and levels off after the doping level exceeds 0.45. This is consistent with the polyaniline becoming fully doped; the theoretical limit for fully doped polyaniline is a doping level of 0.5.

The redoped fibers showed essentially identical or slightly improved peak stress and modulus to the as-spun (170 MPa and 5.8 GPa, respectively). The redoped fibers also showed an extension at break that was twice that for the as-spun fiber (19%). The fiber doped in 1.0 M triflic acid for 15 min. was observed to have the lowest doping level. It is believed by the present inventors that the triflic anion acts as a plasticizer for the doped polyaniline fiber.

Upon redoping the fiber, the lower the pKa of the redoping acid, the more conductive the fiber becomes. There appears to be no correlation between the pKa of the acid and the mechanical properties of the redoped fiber. All of the redoped fibers possessed a higher percent extension at break than the EB fiber, but had lower modulus and peak stress. The fiber

TABLE 15

Mechanical Properties of Polyaniline Fiber Redoped with Triflic Acid.

| Fiber | Conductivity $(S \cdot cm^{-1})$ | Fiber Composition | Peak Stress (MPa) | Modulus (GPa) | Extn. @ Break (%) |
|---|---|---|---|---|---|
| As-spun | 390 | PANI•AMPSA$_{0.18}$ DCAA$_{0.65}$H$_3$PO$_{4\,0.11}$ | 170 | 5.8 | 19 |
| 1.0M CF$_3$SO$_3$H 15 min. | 110 | PANI•Triflate$_{0.17}$ | 160 | 5.2 | 23 |
| 1.0M CF$_3$SO$_3$H 30 min. | 170 | PANI•Triflate$_{0.23}$ | 180 | 5.2 | 39 |
| 1.0M CF$_3$SO$_3$H 1 h | 260 | PANI•Triflate$_{0.34}$ | 170 | 5.2 | 44 |
| 1.0M CF$_3$SO$_3$H 2 h | 270 | PANI•Triflate$_{0.39}$ | 160 | 5.0 | 47 |
| 1.0M CF$_3$SO$_3$H 4 h | 280 | PANI•Triflate$_{0.38}$ | 170 | 5.2 | 42 |
| 1.0M CF$_3$SO$_3$H 8 h | 280 | PANI•Triflate$_{0.38}$ | 180 | 5.5 | 35 |
| 1.0M CF$_3$SO$_3$H 16 h | 310 | PANI•Triflate$_{0.44}$ | 180 | 5.9 | 35 |
| 1.0M CF$_3$SO$_3$H 24 h | 310 | PANI•Triflate$_{0.55}$ | 190 | 5.7 | 47 |
| 0.1M CF$_3$SO$_3$H 8 h | 190 | PANI•Triflate$_{0.25}$ | 200 | 6.5 | 36 |
| 0.1M CF$_3$SO$_3$H 16 h | 240 | PANI•Triflate$_{0.33}$ | 190 | 5.7 | 35 |
| 0.1M CF$_3$SO$_3$H 24 h | 300 | PANI•Triflate$_{0.50}$ | 200 | 5.8 | 40 |

The following observations can be made with respect to the effect of redoping conditions on the electroactivity of the PANI.CF$_3$SO$_3$ fibers:

(a) Conductivity of the fiber is an important factor in determining its electroactivity and actuation in organic and ionic liquid electrolytes. Low electroactivity and no actuation was observed for the least conductive fiber (16 S·cm$^{-1}$);

(b) For conductivities between 110 and 260 S·cm$^{-1}$ (redoping time longer than 15 min. in 1.0 M CF$_3$SO$_3$H), enhanced fiber electroactivity was obtained; and (c) For fibers having conductivity greater than 260 S·cm$^{-1}$ (redoping time longer than 1 h in 1 M CF$_3$SO$_3$H), the electroactivity of the fiber became independent of the fiber's conductivity.

(b) Redoping Solid Fibers with Other Acids:

In a similar manner to the redoping of solid fibers with triflic acid, solid fibers were also redoped with the acids listed in TABLE 16. Except for oxalic acid which is solid, these acids are liquids at room temperature. Solid polyaniline fibers were spun in accordance with the method described in EXAMPLE 2 hereinabove, and were dedoped by contact with a 0.1 M ammonium hydroxide aqueous solution for 30 min. The fibers were then redoped using 1.0 M aqueous of the acids listed in TABLE 17 for 16 h.

Electrical and mechanical properties for the redoped fibers are also summarized in TABLE 16, which also includes the data for the as-spun polyaniline fiber, and for unredoped fiber dedoped using ammonium hydroxide. It is seen that dedoping the fiber caused the modulus and peak stress to be higher than the as-spun polyaniline fiber, but the fiber was more brittle.

redoped with HCl showed the highest modulus, while the fiber redoped with MSA possessed the highest percent extension at break of the measured redoped fibers. Acrylic acid produced the fiber with the highest tensile strength of the measured redoped fibers.

TABLE 16

Electrical and Mechanical Properties of Polyaniline Fiber after Acid Redoping.

| Fiber | pK$_a$ | Modulus (GPa) | Peak Stress (MPa) | Extn. @ Break (%) | Conductivity $(S \cdot cm^{-1})$ |
|---|---|---|---|---|---|
| As-spun | | 4.1 ± 0.3 | 154 ± 5 | 10.9 ± 1.5 | 424 ± 22 |
| EB fiber (dedoped) | | 7.6 ± 0.2 | 187 ± 9 | 3.0 ± 0.4 | <4 × 10$^{-4}$ |
| Redoping Acid | | | | | |
| HCl | −2.2 | 5.6 ± 0.7 | 156 ± 23 | 3.3 ± 1.0 | 383 ± 17 |
| MSA | −2.0 | 2.3 ± 0.2 | 104 ± 6 | 32.5 ± 5.6 | 333 ± 13 |
| Oxalic Acid | 1.23 | 2.8 ± 0.5 | 106 ± 10 | 8.2 ± 2.9 | 188 ± 12 |
| Pyruvic Acid | 2.39 | 3.3 ± 0.1 | 107 ± 11 | 15.0 ± 1.4 | 106 ± 21 |
| Acrylic Acid | 4.25 | 4.7 ± 0.9 | 179 ± 11 | 23.6 ± 4.8 | 45 ± 9 |

(c) Redoping of Hollow Fibers:

Hollow fibers were similarly redoped using acids having smaller volume than AMPSA (volume=169 Å$^3$), and having different values for their acid dissociation constants. The acid-processed hollow fibers were first dedoped using NH$_4$OH according to the procedure set forth in section EXAMPLE 6b hereinabove. The fiber was then divided into five 1 m lengths and each length was contacted with a 100 mL portion of a 1.0 M aqueous solution of one of the acids listed in TABLE 17 for 16 h. The redoped fibers were then allowed to dry under ambient conditions before being characterized.

After drying under ambient conditions, the fibers redoped with MSA or HCl became brittle and difficult to handle without damaging the fiber. However, the fibers that were redoped with the other acids were more flexible. The brittleness of the fibers doped with HCl and MSA are reflected scanning electron microscope cross-sections of these fibers which showed cracks caused from fiber fracturing at room temperature. Analysis of the cross sections of fibers redoped with oxalic acid, pyruvic acid and acrylic acid reveal that the integrity of the hollow fibers remained unaffected by the dedoping/redoping process. It is believed by the present inventors that acids having strong dissociation constants (see TABLE 16 hereof) cause the hollow fibers to become brittle upon redoping.

Analysis of cross sections of the redoped hollow fibers also indicated that the fibers expanded upon redoping. The fiber redoped with HCl showed the smallest degree of expansion (~4%), while the largest degree of expansion was observed for the fiber redoped with oxalic acid (~9%). This effect correlates with the ionic radius of these anions, since fiber swelling is caused by insertion of anions into the polymer as the polymer is doped in order to balance the positive charge formed on the polymer backbone.

Resistivity measurements for the redoped hollow fibers are summarized in TABLE 17. The fiber that was redoped with MSA produced the most conductive fiber, while the fiber doped with acrylic acid is the most resistive. The data in TABLE 17 indicate that the pKa of the acid influences the resistivity of the redoped hollow fiber. The resistivity of the fiber remains essentially the same when the acid has a pKa of less than 2, but the fiber resistance increases as the pKa of the acid becomes higher. It is known that polyaniline becomes fully doped after sufficient contact time when the pH of the acid solution is below about 3. A 1.0 M aqueous solution of acrylic acid (pKa=4.25) does not have sufficient acid strength to fully dope the EB hollow fiber and consequently, the resistivity of the acrylic redoped fiber is the highest.

TABLE 17

Electrical Properties of Polyaniline Hollow Fibers following Acid Redoping.

| Redoping Acid | Resistance after redoping (Ω/cm length of fiber) |
| --- | --- |
| MSA | 7.7 ± 0.3 |
| HCl | 10.0 ± 10.1 |
| Oxalic Acid | 10.4 ± 0.2 |
| Pyruvic Acid | 14.8 ± 0.2 |
| Acrylic Acid | 80 ± 2 |

EXAMPLE 8

Thermal Stability Measurements:

The as-spun polyaniline fiber prepared in EXAMPLE 2 that was processed with a stretch ratio of 1.2 (fiber #1 in TABLE 3) was first dedoped according to the teachings of EXAMPLE 6. In a typical procedure, 6 m of the as-spun AMPSA doped fiber was first dedoped to its EB oxidation state by immersing the fiber in a 0.1 M aqueous solution of ammonium hydroxide for 30 min. After the fiber was dried for 24 h under ambient conditions, the fiber was divided into 3 approximately equal length samples. In accordance with the teachings of EXAMPLE 7, the first sample of the EB fiber was redoped with phosphoric acid by immersing the fiber in a 1.0 M solution of phosphoric acid for 24 h, while the second sample of fiber was redoped with triflic acid by immersing the fiber in a 1.0 M solution of triflic acid for 24 h. The third sample was not redoped. The redoped fibers were dried under ambient conditions for 48 h. The thermal stability of the phosphoric acid and triflic acid redoped polyaniline fibers, the EB fiber, and the AMPSA-doped polyaniline fiber was investigated.

The thermal stability of these fibers was evaluated by thermogravimetric analysis (TGA) to determine their stability against weight loss (dopant loss) between 25° C. and 500° C. For these measurements, the temperature was varied at about 10° C./min. While the initial weight loss between 25° C. and about 150° C. corresponds to loss of absorbed water from the fiber, the weight loss that is observed between 150 and 300° C. is related to the loss of the dopant molecules. Temperatures exceeding 300° C. resulted in the degradation of the polyaniline backbone, as indicated by the weight loss observed for the EB fiber.

The as-spun PANI.AMPSA fiber possessed the lowest thermal stability, which can be attributed to the thermal decomposition of the AMPSA dopant molecules at 195° C. The fiber redoped with triflic acid showed a 10° C. improvement in thermal stability, while the onset of thermal decomposition for the fiber redoped with phosphoric acid was about 60° C. higher than that observed for the as-spun AMPSA-doped fiber.

Fibers redoped with phosphoric acid were also found to have flame retardant properties. When the fibers were placed in direct contact with a flame, they did not ignite as would, for example, AMPSA-doped fibers.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for spinning polyaniline fiber, comprising the steps of:
   (a) adding between 6 and 14 mass % of a mixture of 2-acrylamido-2-methyl-1-propanesulfonic acid (AMPSA) and polyaniline containing between 2 and 12 mass % of water to dichloroacetic acid (DCAA), such that there are between 30 and 100 molecules of AMPSA per 100 aniline repeat units of the polyaniline, forming thereby a composition, wherein during said step of addition the temperature of the composition does not rise above about 35° C.;
   (b) continuously extruding the composition through a spinneret into a coagulant, thereby forming a polyaniline fiber.

2. The method for spinning polyaniline fiber as described in claim 1, wherein the polyaniline has a weight average molecular weight, $M_w$, between about 90,000 g·mol$^{-1}$ and about 350,000 g·mol$^{-1}$.

3. The method for spinning polyaniline fiber as described in claim 1, wherein there are approximately 60 molecules of AMPSA per 100 aniline repeat units in the polyaniline.

4. The method for spinning polyaniline fiber as described in claim 1, wherein the polyaniline contains between about 2 mass % and about 12 mass % of water, whereby said composition contains between 0.1 and 0.6 mass % of water.

5. The method for spinning polyaniline fiber as described in claim 1, wherein said step of addition the temperature of the composition is 25±5° C.

6. The method for spinning polyaniline fiber as described in claim 1, wherein said step of extruding the composition into a coagulant comprises immersing the spinneret into the coagulant or by permitting the solution to pass through an air gap before entering the coagulant.

7. The method for spinning polyaniline fiber as described in claim 1, wherein the coagulant is selected from the group consisting of esters, ketones and alcohols and mixtures thereof.

8. The method for spinning polyaniline fiber as described in claim 7, wherein the esters comprise ethyl acetate and butyl acetate.

9. The method for spinning polyaniline fiber as described in claim 1, wherein the coagulant consists of ethyl acetate.

10. The method for spinning polyaniline fiber as described in claim 7, wherein the ketones comprise acetone, methyl-isobutyl ketone, and 2-butanone.

11. The method for spinning polyaniline fiber as described in claim 7, wherein the alcohols comprise methanol, ethanol, and isopropyl alcohol.

12. The method for spinning polyaniline fiber as described in claim 1, further comprising the step of heating the polyaniline fiber to between about 50 and about 100° C. after said step of extruding the composition into a coagulant.

13. The method for spinning polyaniline fiber as described in claim 12, wherein the polyaniline fiber is heated to between about 70 and about 90° C.

14. The method for spinning polyaniline fiber as described in claim 12, further comprising the step of stretching the heated polyaniline fiber up to about 3× its unstretched length.

15. The method for spinning polyaniline fiber as described in claim 14, wherein the heated polyaniline fiber is stretched to between about 1.2 and about 2.5 times its unstretched length.

16. The method for spinning polyaniline fiber as described in claim 14, wherein said step of stretching the heated polyaniline fiber comprises stretching the heated polyaniline fiber between two pairs of godet cylinders, the polyaniline fiber passing around a first pair of godet cylinders before passing around the second pair of godet cylinders.

17. The method for spinning polyaniline fiber as described in claim 16, wherein said step of heating the polyaniline fiber occurs after the polyaniline fiber exits the first pair of godet cylinders, and before the fiber enters the second pair of godet cylinders.

18. The method for spinning polyaniline fiber as described in claim 1, further comprising the step of removing the DCAA from the polyaniline fiber after said step of extruding the composition into a coagulant.

19. The method for spinning polyaniline fiber as described in claim 1, further comprising the step of collecting the polyaniline fiber.

20. The method for spinning polyaniline fiber as described in claim 1, further comprising the step of forming the polyaniline fiber into a yarn.

* * * * *